(12) United States Patent
Bley

(10) Patent No.: US 7,411,019 B1
(45) Date of Patent: Aug. 12, 2008

(54) POLYMER COMPOSITES CONTAINING NANOTUBES

(75) Inventor: Richard A. Bley, Longmont, CO (US)

(73) Assignee: Eltron Research, Inc., Boulder, CO (US)

( * ) Notice: Subject to any disclaimer, the term of this patent is extended or adjusted under 35 U.S.C. 154(b) by 503 days.

(21) Appl. No.: 10/927,628

(22) Filed: Aug. 25, 2004

Related U.S. Application Data

(60) Provisional application No. 60/497,896, filed on Aug. 25, 2003.

(51) Int. Cl.
| | |
|---|---|
| C08K 3/04 | (2006.01) |
| C08K 3/00 | (2006.01) |
| C08G 83/00 | (2006.01) |
| C08L 63/00 | (2006.01) |
| C08L 67/00 | (2006.01) |
| C08L 77/00 | (2006.01) |

(52) U.S. Cl. ............... 524/847; 528/205; 528/206; 528/210; 528/219; 977/742; 977/743; 977/745; 977/746; 977/748; 977/749; 977/750; 977/752; 977/753

(58) Field of Classification Search ......... 524/847; 977/734, 742, 743, 745, 746, 748, 749, 750, 977/752, 753; 528/86, 205, 206, 210, 219
See application file for complete search history.

(56) References Cited

U.S. PATENT DOCUMENTS

| | | | |
|---|---|---|---|
| 6,183,714 B1 | 2/2001 | Smalley et al. | |
| 6,265,466 B1 | 7/2001 | Glatowski et al. | |
| 6,331,256 B1 | 12/2001 | Kezuka et al. | |
| 6,576,341 B1 | 6/2003 | Davey et al. | |
| 6,746,627 B2 | 6/2004 | Niu et al. | |
| 2002/0046872 A1 | 4/2002 | Smalley et al. | |
| 2002/0048632 A1 | 4/2002 | Smalley et al. | |
| 2002/0068170 A1 | 6/2002 | Smalley et al. | |
| 2005/0043503 A1* | 2/2005 | Stoddart et al. | 528/377 |

FOREIGN PATENT DOCUMENTS

| | | |
|---|---|---|
| EP | 0949 199 B1 | 5/2003 |
| JP | 2000-044216 * | 2/2000 |
| WO | WO 00/17102 | 3/2000 |
| WO | WO 00/26138 | 5/2000 |
| WO | WO 02/16257 A3 | 2/2002 |
| WO | WO 03/057955 A2 | 7/2003 |

OTHER PUBLICATIONS

Registry data of PmPV (RN 184431-56-9), provided by STN.*
Huang et al. "A novel rigid-rod alternating poly(p-phenylenevinylene) derivative with oligo(ethylene oxide) side chains." Polymer 42 (2001) 3929-3938.*
Xiang et al. "Synthesis and Characterization of Novel Soluble Alternating Copoly(phenylene vinylene) Derivative for Light-Emitting Electrochemical Cell." Published online Feb. 19, 2003 in Wiley InterScience (www.interscience.wiley.com). DOI 10.1002/app. 11841.*
Liang et al. "Micropatterning of Conducting Polymer Thin Films on Reactive Self-assembled Monolayers." Chem. Mater. 2003, 15, 2699-2701. Published on Web Jun. 17, 2003.*
Curran et al. (1998) "A Composite from Poly(m-phenylenevinylene-co-2,5-dioctoxy-p-phenylenevinylene) and Carbon Nanotubes: A Novel Material for Molecular Optoelectronics," *Adv. Mater.* 10:1091-1093.
Iijima (1991) "Helical Microtubles of Graphitic Carbon," *Nature* 354:56-58.
Iijima et al. (1993) "Single-Shell Carbon Nanotubes of 1-nm Diameter," *Nature* 363:603-605.
Lambert et al. (1994) "Improving Conditions Towards-Isolating Single-Shell Carbon Nanotubes," *Chem. Phys. Lett.* 236:364-371.
Thess et al. (1996) "Crystalline Ropes of Metallic Carbon Nanotubes," *Science* 273:483-488.
Zhao et al. (2001) "Chromatographic Purification and Properties of Soluble Single-Walled Carbon Nanotubes," *J. Am. Chem. Soc.* 123:11673-11677.

* cited by examiner

*Primary Examiner*—Michael J Feely
(74) *Attorney, Agent, or Firm*—Greenlee, Winner and Sullivan P.C.

(57) ABSTRACT

The present invention relates to polymer composite materials containing carbon nanotubes, particularly to those containing singled-walled nanotubes. The invention provides a polymer composite comprising one or more base polymers, one or more functionalized m-phenylenevinylene-2,5-disubstituted-p-phenylenevinylene polymers and carbon nanotubes. The invention also relates to functionalized m-phenylenevinylene-2,5-disubstituted-p-phenylenevinylene polymers, particularly to m-phenylenevinylene-2,5-disubstituted-p-phenylenevinylene polymers having side chain functionalization, and more particularly to m-phenylenevinylene-2,5-disubstituted-p-phenylenevinylene polymers having olefin side chains and alkyl epoxy side chains. The invention further relates to methods of making polymer composites comprising carbon nanotubes.

40 Claims, No Drawings

POLYMER COMPOSITES CONTAINING NANOTUBES

CROSS-REFERENCE TO RELATED APPLICATIONS

This application claims the benefit under 35 U.S.C. 119(e) of U.S. Provisional Application No. 60/497,896, filed Aug. 25, 2003, which is incorporated in its entirety by reference herein.

STATEMENT REGARDING FEDERALLY SPONSORED RESEARCH OR DEVELOPMENT

The present invention was made at least in part with funding from the United States government through NASA, grant numbers NAS-9-00116 and NAS-9-00028 and NSF grant number DMI-0128073. The United States government has certain rights in this invention.

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to polymer composite materials containing carbon nanotubes, particularly to composites containing singled-walled nanotubes, in which the nanotube is solubilized or dispersed in a polymer by contacting the nanotube with a m-phenylenevinylene-2,5-disubstituted-p-phenylenevinylene.

Multi-walled carbon nanotubes (MWNTs) were first discovered in 1991 as a result of research on fullerenes. [S. Iijima (1991)]. Several years later single walled carbon nanotubes (SWNTs) were discovered. [S. Iijima and T. Ichihashiy (1993)]. A SWNT can be described as a giant molecule made from a single sheet of graphite wrapped around and joined with itself to form a cylinder whose two ends are each capped with the hemisphere of a fullerene. Multi-walled carbon nanotubes are made up of several of these tubes, where smaller diameter tubes are concentrically contained within larger diameter tubes. SWNTs are known to self-aggregate to form ropes [A. Thess et al. (1996)]. Carbon nanotubes have been found to possess a wide variety of extraordinarily useful properties, encouraging interest, especially within the past few years, in development of the technology required to exploit these properties. (See: Ebbesen (ed.) "Carbon Nanotubes, Preparation and Properties" CRC Press (1996); Saito R. et al. "Physical Properties of Carbon Nanotubes" World Scientific (1998); Dresselhaus et al. "Carbon Nanotubes: Synthesis, Structure, Properties and Applications" (2000) Springer-Verlag.) Their potential for use as composite reinforcements comes from their remarkable mechanical properties. Carbon nanotubes potentially have excellent fiber reinforcement properties in part because of their exceptionally high aspect ratios (the length of the tubes relative to their diameter) which can be as great as or greater than one million. Their theoretical strength has been calculated to be more than one hundred times that of steel, and yet they are only one sixth the density of steel. They have also been found to be much stiffer than other reinforcement materials, such as carbon fibers, but are much less brittle. Their potential to produce materials with a high strength to weight ratio make them ideal reinforcement candidates for incorporation into advanced structural composites for the various applications, particularly in the aerospace industry. These materials have potential application in many consumer products from automobiles to sports equipment.

In addition to extraordinary mechanical properties, carbon nanotubes are predicted to have useful electronic, thermal and magnetic properties. Some of these other properties are capable of being tuned by varying the diameter and/or the chirality of the tubes. [M. S. Dresselhaus, et al. (1996)]

The difficulty in realizing the potential carbon nanotubes have for providing enhanced mechanical strength to polymer based composites has been their inability to homogeneously or uniformly disperse, either in the polymer precursors or in the polymers themselves. Carbon nanotubes, and particularly single walled carbon nanotubes (SWNTs), can be micrometers or even longer in length. While their extremely long length relative to their width means that they should have good fiber properties, it also means that they are not readily soluble in solvents. While there has been some success at dispersing shorter nanotubes in polymers, composites made with these short nanotubes having low aspect ratios have not realized the anticipated increases in the strength of the final composite.

Recently, Curran et al. (1998) reported that MWNTs (500 nm to 1.5 micron in length) were dissolved in a toluene solution using the polymer poly (m phenylenevinylene co-2,5-dioctoxy-p-phenylenevinylene) [abbreviated as co-2,5-dioctyl-PmPV]. They authors indicated that they were able to get the nanotubes to dissolve in organic solvents, such as toluene, because the co-2,5-dioctyl-PmPV polymer wrapped around the nanotube and held it in suspension in the polymer/toluene solution. In part, it was believed that the polymer employed separated ropes of SWNTs. The authors reported mixing nanotube powder and the co-2,5-dioctyl-PmPV polymer in toluene and briefly sonicating the mixture to obtain dissolution. The structure of co-2,5-dioctyl-PmPV is a variation of the more common light-emitting polymer polyphenylenevinylene (PPV). The bonds between the two alternating moieties making up the polymer backbone in co-2,5-dioctyl-PmPV, however leads to dihedral angles in the chain causing the chain to coil, thereby forming a helical structure along the polymer backbone. The diameter of this helix in a vacuum has been calculated to be 2 nm with a pitch of 0.6 nm. The size of the helix, as pointed out by the authors "fits nicely around a nanotube."

U.S. Pat. No. 6,576,341 and EP patent 094919B1 relate to the use of an organic material, particularly a polymer, to purify nanotube soot by forming a nanotube/polymer composite suspension in a solvent. The composite is then separated from the solvent. Preferred embodiment of the invention the organic material is a polymer. A preferred polymer is poly(m-phenylene-co-2,5-dioctoxy-p-phenylenevinylene). Other organic materials said to be useful in the invention are poly(dioctyl fluorene), poly(sulphonic acid), polyacetylene and DNA.

Published PCT application WO/02/16257 (published Feb. 28, 2002) reports polymer wrapped or coated SWNTs. Amphiphilic polymers, such as polymer surfactants, were said to be useful in the invention. Specific polymers said to be useful in the invention were polyvinyl pyrrolidone, polystyrene sulfonate, poly(1-vinyl pyrrolidone-co-vinyl acetate), poly(1-vinyl pyrrolidone-co-acrylic acid), poly(1-vinyl pyrrolidone-co-dimethylaminoethyl methacrylate), polyvinyl sulfate, poly(sodium styrene sulfonic acid-co-maleic acid), dextran, dextran sulfate, bovine serum albumin, poly(methyl methacrylate-co-ethyl acrylate), polyvinyl alcohol, polyethylene glycol, polyallyl amine, and mixtures thereof. SWNTs wrapped or coated with PVP are exemplified. The polymer-wrapped or coated SWNTs are said to be useful in mechanical and structural applications. The polymer-wrapped or coated SWNTs are said to be useful in the preparation of electrically-insulating material having wrapped or coated SWNTs suspended in them. Electrically insulating materials including poly(methyl methacrylate), polystyrene, polypropylene, nylon, polycarbonate, polyolefin, polyethylene, polyester, polyimide, polyamide, epoxy, and phenolic resin are reported to be useful in materials of the invention. SWNTs are reported to be successfully solubilized by wrapping with PVP polymers, polystyrene sulfonate (PSS), poly(1-vinyl pyrrolidone-co-vinyl acetate) (PVPNA), poly(1-vinyl pyrrolidone-co-acrylic acid), poly(1-vinyl pyrrolidone-co-dimethylaminoethyl methacrylate), polyvinyl sulfate, poly(sodium styrene sulfonic acid-co-maleic acid), dextran, dextran sulfate, bovine serum albumin, poly(methyl methacrylate-co-ethyl acrylate), polyvinyl alcohol, polyethylene glycol, and polyallyl amine. The published application provides the following explanation "the examples indicate that the wrapping of the SWNTs by water-soluble polymers is a general phenomenon, driven largely by a thermodynamic drive to eliminate the hydrophobic interface between the tubes and their aqueous medium." Several US patent applications are related to this PCT published application: US 200020046872, US 20020048632 and US 200020068170 (all filed Aug. 23, 2001). This reference does not however report functionalization of polymers used for solubilizing carbon nanotubes and does not teach or suggest selection of functionalization of the wrapping polymer for compatibility with the electrically insulating materials into which the carbon nanotubes are to be introduced.

U.S. Pat. No. 6,331,265 relates to reinforced polymers containing carbon nanotubes. Carbon nanotubes are reported to be introduced into a polymer, followed by stretching the mixture at or above the melting temperature of the polymer to orient the nanotubes. The patent discusses problems associated with orienting carbon nanotubes in polymers. Specifically disclosed polymers are polyolefins, such as a polyethylene or a polypropylene or blends thereof.

U.S. Pat. No. 6,265,466 relates to a composite having oriented nanotubes to provide electromagnetic shielding. The composite is made by adding nanotubes to a polymer and imparting a shearing force to the polymer and nanotubes to orient the nanotubes. Polymeric material said to be useful in the invention include thermoplastics, thermosets, and elastomers and more specifically polyethylene, polypropylene, polyvinyl chloride, styrenics, polyurethanes, polyimides, polycarbonate, polyethylene terephthalate, acrylics, phenolics, unsaturated polyesters, as well as the natural polymers cellulose, gelatin, chitin, polypeptides, polysaccharides, or other polymeric materials of plant, animal, or microbial origin.

U.S. Pat. No. 6,746,627 relates to an electrically conductive composite comprising a polyvinylidene fluoride polymer or copolymer and carbon nanotubes. The composites are prepared by mixing or dispersing carbon nanotubes in polymer emulsion using an energy source (e.g., a blender) followed by removal of the liquid to obtain the composite.

BRIEF SUMMARY OF THE INVENTION

The present invention relates to polymer composite materials containing carbon nanotubes, particularly to those containing singled-walled nanotubes. The invention provides a polymer composite comprising one or more base polymers, one or more functionalized m-phenylenevinylene-2,5-disubstituted-p-phenylenevinylene polymers and carbon nanotubes. In a specific embodiment, at least a portion of the one or more functionalized m-phenylenevinylene-2,5-disubstituted-p-phenylenevinylene polymers forms an aggregate with at least a portion of the carbon nanotubes in the polymer composite. The carbon nanotubes of the polymer composite include, among others, single-walled carbon nanotubes and ropes of single-walled nanotubes or both. The base polymer can be a thermoset polymer or a thermoplastic polymer. The base polymer can be a copolymer or a block copolymer. Thermoset polymers that are useful as base polymers include epoxies and polyesters. Exemplary base polymers include an epoxy, a polyester, or a nylon.

In the polymer composites of this invention the aggregate formed by mixing of the one or more functionalized m-phenylenevinylene-2,5-disubstituted-p-phenylenevinylene polymers with carbon nanotubes are polymer wrapped carbon nanotubes. Preferred functionalized m-phenylenevinylene-2,5-disubstituted-p-phenylenevinylene polymers are those that form helical structure.

Polymer composites of this invention include those in which one or more of the functionalized m-phenylenevinylene-2,5-disubstituted-p-phenylenevinylene polymers contains one or more reactive or latent reactive groups which at least in part react with functional groups of the one or more base polymers to form one or more bonds, including electrostatic bonds, hydrogen bonds covalent bonds.

Polymer composites of this invention include those in which one or more of the functionalized m-phenylenevinylene-2,5-disubstituted-p-phenylenevinylene polymers contains one or functional groups which interact with one or more functional groups of the one or more base polymers (and/or polymer precursors of the base polymer) via van der Waals interactions or bonding. Polymer composites of the invention include those wherein one or more of the functionalized m-phenylenevinylene-2,5-disubstituted-p-phenylenevinylene polymers function for cross-linking one or more molecules of the one or more base polymers.

Polymer composites of the invention include those produced by forming an aggregate of one or more functionalized m-phenylenevinylene-2,5-disubstituted-p-phenylenevinylene polymers with carbon nanotubes, adding the aggregate to a base polymer precursor composition and polymerizing the base polymer. Preferably after addition of the aggregate to the base polymer precursor composition, the base polymer precursor composition is stirred to disperse the aggregates. More preferably vigorous stirring is applied to disperse the aggregates and carbon nanotubes.

Polymer composites of the invention can be produced by forming an aggregate of one or more m-phenylenevinylene-2,5-disubstituted-p-phenylenevinylene polymers having one or more double bonds in one or more side chain substituents with carbon nanotubes and thereafter reacting the m-phenylenevinylene-2,5-disubstituted-p-phenylenevinylene polymers of the aggregate to introduce at least one functional group into a m-phenylenevinylene-2,5-disubstituted-p-phenylenevinylene polymer of the aggregate to form a functionalized aggregate which is added to the base polymer precursor composition. Specifically polymer composite formed by such a method are those in which the functional group introduced into the side chain of the one or more m-phenylenevinylene-2,5-disubstituted-p-phenylenevinylene polymers of the aggregate is an epoxy group and wherein the base polymer is an epoxy.

Polymer composites of this invention can contain beneficial polymer additives known in the art, such as one or more plasticizers.

The invention also provides a method for preparation of a polymer composite in which one or more aggregates of one or more functionalized m-phenylenevinylene-2,5-disubstituted-p-phenylenevinylene polymers and carbon nanotubes are formed, the aggregates are added to and dispersed in a base polymer precursor composition which comprises one or more precursors for formation of one or more base polymers. The polymer precursors in the base polymer precursor composition are then polymerized. The base polymer precursor composition contains polymer monomers, in addition to other reagents, catalysts, cross-linking agents needed or beneficial for polymerization of the base polymer. The compositions can also contain other beneficial polymer additives that are known in the art, such as one or more plasticizers. The method for making polymer composites optionally comprises a step of crosslinking one or more of the functional groups of the one or more m-phenylenevinylene-2,5-disubstituted-p-phenylenevinylene polymers with one or more functional groups of the one or more base polymers. The method of the invention may further comprise one or more polymer curing steps. During the formation of the polymer composite comprising functionalized m-phenylenevinylene-2,5-disubstituted-p-phenylenevinylene polymers of this invention, the temperature employed during polymerization, curing or post-cure treatments are preferably sufficiently low to avoid any substantial decomposition of the functionalized m-phenylenevinylene-2,5-disubstituted-p-phenylenevinylene polymer. In a specific embodiment, the one or more aggregates included in the polymer composites of this invention are formed by mixing one or more functionalized m-phenylenevinylene-2,5-disubstituted-p-phenylenevinylene polymers with carbon nanotubes wherein the weight ratio of m-phenylenevinylene-2,5-disubstituted-p-phenylenevinylene polymers to carbon nanotubes ranges from about 10:1 to about 1:10. In another embodiment, the weight ratio of m-phenylenevinylene-2,5-disubstituted-p-phenylenevinylene polymers to carbon nanotubes employed to form aggregates ranges from 2:1 to 1:2. In a specific embodiment, the amount of carbon nanotubes in the polymer composite ranges prepared by the methods herein ranges from about 0.1% by weight to about 20% by weight of the total weight of the polymer composite. In other specific embodiment, the amount of carbon nanotubes in the polymer composite ranges from about 0.1% by weight to about 10% by weight of the total weight of the polymer composite; from about 0.1% by weight to about 5% by weight of the total weight of the polymer composite; from about 0.1% by weight to about 1% by weight of the total weight of the polymer composite; or less than about 1-5% by weight of the total weight of the polymer composite.

In an embodiment, the carbon nanotube is solubilized or dispersed in the polymer by contacting the nanotube with a functionalized m-phenylenevinylene-2,5-disubstituted-p-phenylenevinylene polymer having the formula:

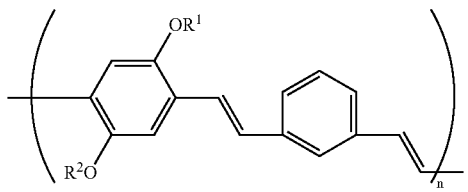

where n is the number of repeating units in the polymer and $R^1$ and $R^2$ are the 2,5 substituents, for example, optionally substituted alkyl and alkenyl groups. $R^1$ and $R^2$ may also contain ether linkages, i.e. in which one or more —$CH_2$— groups (other than the carbon bonded to oxygen in the above formula) in $R^1$ and $R^2$ may be replaced with an —O—. $R^1$ and $R^2$ an be substituted with one or more halogens; —OH groups; —COX groups, where X is a halogen or an activated ester, such as a tosyl group; —COO$^-$, COOR$^3$, amine (—N(R$^3$)$_2$) or ammonium (—N(R$^3$)$_3$$^+$) groups, where each $R^3$, independently, is H, an optionally substituted alkyl group, or alkenyl group, particularly a halogenated alkyl or halogenated alkenyl group; epoxy groups:

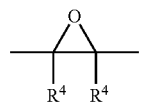

where each $R^4$ independently is H or an alkyl group (particularly an alkyl group having 1 to 3 carbon atoms); and silyl (—S(R$^5$)$^3$) groups where each $R^5$ independently is H, an optionally substituted alkyl group, or alkenyl group, particularly a halogenated alkyl or halogenated alkenyl group. $R^3$, $R^4$ and $R^5$ groups include those that have from 1 to 6 carbon atoms. Particular $R^3$, $R^4$ and $R^5$ groups are H, methyl, ethyl, propyl, butyl, pentyl, trifluoromethyl, and trichloromethyl groups.

The length of the $R^1$ and $R^2$ groups and their functionalization can be varied. $R^1$ and $R^2$ groups generally can have from 3 to about 20 carbon atoms. $R^1$ and $R^2$ groups can have from 10 to about 20 carbon atoms, $R^1$ and $R^2$ groups can have from 8 to about 20 carbon atoms. More preferably $R^1$ and $R^2$ groups have from 3 to about 10 carbon atoms. The number of repeating units, n, in the substituted m-phenylenevinylene-2,5-disubstituted-p-phenylenevinylene can also be varied. In general, the substituted m-phenylenevinylene-2,5-disubstituted-p-phenylenevinylene has molecular weight ranging from about 2,000 Daltons to about 100,000 Daltons, thus n varies from about 10 to about 300 (dependent upon the $R^1$ and $R^2$ groups present).

Preferred $R^1$ and $R^2$ are optionally substituted alkenyl groups or substituted alkyl groups, particularly alkyl groups having one epoxy group, one amine or ammonium group, one carboxylic acid, carboxylic ester or carboxylate group. Additionally preferred groups are alkyl and alkenyl groups substituted with one or more halogens, particularly one or more fluorines or chlorines. $R^1$ and $R^2$ groups include perhalogenated alkenyl groups and perhalogenated alkyl groups.

In a specific embodiment, $R^1$ and $R^2$ cannot both be an unsubstituted alkyl group.

In another specific embodiment, neither of $R^1$ or $R^2$ is an unsubstituted alkyl group. In another specific embodiment, $R^1$ and $R^2$ cannot be octadecyl groups.

In an embodiment $R^1$ and $R^2$ are the same groups. In an embodiment $R^1$ and $R^2$ are alkenes which may be straight-chain, branched or may contain cyclic portions. $R^1$ and $R^2$ can have one, two or more double bonds which may be conjugated or non-conjugated double bonds. Preferred $R^1$ and $R^2$ groups that are alkenes have one double bond. $R^1$ and $R^2$ alkenes may have cis or trans double bonds or a mixture of cis and trans double bonds. In an embodiment $R^1$ and $R^2$ are alkenes, particularly those having one double bond and more particularly those having the structures:

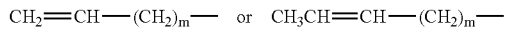

where m is an integer ranging from 1 to about 17 and more preferably m ranges from 1 to about 5 or 6. In a preferred embodiment, $R^1$ and $R^2$ are ω-alkenes.

More preferred $R^1$ and $R^2$ groups are co-alkenyl groups having from 3 to about 20 carbon atoms, particularly alkenyl groups having a straight-chain alkyl portion. $R^1$ and $R^2$ groups include ω-alkenyl groups having from 8-20 carbon atoms, those having 10-20 carbon atoms, and those having 14-20 carbon atoms. A specific $R^1$ and $R^2$ group is an ω-octadecylene group [$CH_2$=CH—$(CH_2)_{16}$— group].

In an embodiment, the m-phenylenevinylene-2,5-disubstituted-p-phenylenevinylene of this invention is combined with single-walled carbon nanotubes (SWNTs) or multi-walled carbon nanotubes (MWNTs). In a preferred embodiment, the m-phenylenevinylene-2,5-disubstituted-p-phenylenevinylene of this invention is combined with single-walled carbon nanotubes (SWNTs). Preferably the carbon nanotubes employed in making composite materials of the invention are purified prior to mixing with the m-phenylenevinylene-2,5-disubstituted-p-phenylenevinylene to maximize the amount of carbon nanotubes in a given sample. In a specific embodiment, carbon nanotubes are purified employing a method described herein below.

In an embodiment $R^1$ and $R^2$ are functionalized with a group which will interact with the polymer matrix into which the nanotube is to be introduced. For example, the $R^1$ and $R^2$ groups are functionalized with one or more epoxy groups, with one or more halogens, with one or more amine or ammonium groups, with one or more carboxylic acid, carboxylate, carboxylate ester or acid halide groups, or with one or more double bonds. In an embodiment $R^1$ and $R^2$ can contain one or more double bonds, and particularly one double bond distal to the bond between the $R^1$ and $R^2$ group and the polymer backbone. In an embodiment $R^1$ and $R^2$ each contain one double bond that is an ω-double bond in the alkene.

In an embodiment, at least one of $R^1$ or $R^2$ contains a group that is reactive group or a latent reactive group. A reactive group reacts with another chemical species under selected reaction conditions. A latent reactive group can be activated to react with another chemical species under selected reaction conditions. Reactive and latent reactive groups include functional groups which will react or can be activated to react with groups in the polymer matrix to which the substituted m-phenylenevinylene-2,5-disubstituted-p-phenylenevinylene polymer/carbon nanotube mixture is introduced. For example, reactive and latent reactive groups can be functional groups which react during polymerization of the polymer matrix into which the substituted m-phenylenevinylene-2,5-disubstituted-p-phenylenevinylene polymer/carbon nanotube mixture is introduced. For example, the reactive and latent reactive groups can function as cross-linking groups during polymerization of the polymer matrix.

In a specific embodiment, $R^1$ and $R^2$ can contain one or more epoxy groups, particularly of formulas:

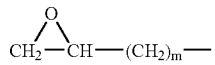 

where m is an integer ranging from 1 to about 17. The integer m can range from 1 to about 7. The integer m can range from 2 to about 7. One or more hydrogens of the $CH_2$ groups of $R^1$ and $R^2$ may be replaced with halogens.

In a specific embodiment, $R^1$ and $R^2$ can contain one or more epoxy groups, particularly of formulas:

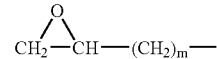

where m is an integer ranging from 1 to about 17. The integer m can range from 1 to about 7. The integer m can range from 2 to about 7. One or more hydrogens of the $CH_2$ groups of $R^1$ and $R^2$ may be replaced with halogens.

In another specific embodiment, $R^1$ and $R^2$ may be partially or fully halogenated (particularly fluorinated) alkyl groups, particularly perfluorinated alkyl groups.

Functionalized m-phenylenevinylene-2,5-disubstituted-p-phenylenevinylene polymers are prepared by methods known in the art in view of the guidance provided herein or by routine modification of those methods. Starting materials for the preparation of functionalized PmPV m-phenylenevinylene-2,5-disubstituted-p-phenylenevinylene polymers are available commercially or can be made by art-known methods. U.S. Pat. No. 6,576,341 provides additional guidance for the synthesis of m-phenylenevinylene-2,5-disubstituted-p-phenylenevinylene polymers.

In a specific embodiment, m-phenylenevinylene-2,5-disubstituted-p-phenylenevinylene polymers are functionalized after the m-phenylenevinylene-2,5-disubstituted-p-phenylenevinylene polymer is mixed with carbon nanotubes. For example, a m-phenylenevinylene-2,5-disubstituted-p-phenylenevinylene polymer in which $R^1$ or $R^2$ or both carry at least one double bond is initially mixed with carbon nanotubes and the mixture is thereafter subjected to functionalization, e.g. functionalization of the at least one double bond of the m-phenylenevinylene-2,5-disubstituted-p-phenylenevinylene polymer. For example, the double bond can be epoxidized, oxidized or substituted with one or two functional groups.

Functionalized m-phenylenevinylene-2,5-disubstituted-p-phenylenevinylene is employed to solubilize or disperse carbon nanotubes in selected polymer matrices. Initially a mixture of the substituted m-phenylenevinylene-2,5-disubstituted-p-phenylenevinylene with the carbon nanotube is prepared and thereafter the m-phenylenevinylene-2,5-disubstituted-p-phenylenevinylene/carbon nanotube mixture is introduced into a polymer matrix. The m-phenylenevinylene-2,5-disubstituted-p-phenylenevinylene/carbon nanotube mixture may be introduced into any polymer matrix. The m-phenylenevinylene-2,5-disubstituted-p-phenylenevinylene/carbon nanotube mixture may be introduced into a thermoset polymer or a thermoplastic polymer. Exemplary polymers into which the mixture may be introduced include, among others, epoxies, polyesters and nylons. In a specific embodiment, the polymer into which the m-phenylenevinylene-2,5-disubstituted-p-phenylenevinylene/carbon nanotube mixture is introduced is not a m-phenylenevinylene-2,5-disubstituted-p-phenylenevinylene polymer. In a specific embodiment the polymer into which the m-phenylenevinylene-2,5-disubstituted-p-phenylenevinylene/carbon nanotube mixture is introduced is not m-phenylenevinyl-2,5-dioctadecyloxy-p-phenylenevinylene.

The nanotube/functionalized m-phenylenevinylene-2,5-disubstituted-p-phenylenevinylene polymer mixtures of this invention are useful for preparation of polymer composite materials having improved mechanical properties. The m-phenylenevinylene-2,5-disubstituted-p-phenylenevinylene polymers are functionalized as described herein to contain functional groups that interact with the matrix of the polymer which enhances the mechanical properties of the composites formed when the nanotube/functionalized m-phenylenevinylene-2,5-disubstituted-p-phenylenevinylene polymer mixture is added thereto. The functional groups of the m-phenylenevinylene-2,5-disubstituted-p-phenylenevinylene polymer interact with the polymer matrix by non-covalent or covalent bonding or more preferably through the formation of covalent bonds between m-phenylenevinylene-2,5-disubstituted-p-phenylenevinylene substituent groups and the polymer matrix.

In a preferred embodiment, the substituted m-phenylenevinylene-2,5-disubstituted-p-phenylenevinylene/carbon nanotube mixture is prepared by initial preparation of a m-phenylenevinylene-2,5-disubstituted-p-phenylenevinylene where $R^1$ and $R^2$ are alkenes having one or more double bonds. The alkene-substituted m-phenylenevinylene-2,5-disubstituted-p-phenylenevinylene is mixed with carbon nanotubes to allow solubilization and/or dispersion of the carbon nanotubes by the m-phenylenevinylene-2,5-disubstituted-p-phenylenevinylene. Thereafter, the solubilized and/or dispersed mixture of the alkene-substituted m-phenylenevinylene-2,5-disubstituted-p-phenylenevinylene with nanotubes is subjected to chemical reaction to add functional groups to or across the one or more double bonds of the substituted m-phenylenevinylene-2,5-disubstituted-p-phenylenevinylene. The double bonds can, for example, be epoxidized, treated to add one or more amines or acid halides, hydrolyzed (to add OH), or otherwise treated to add one or more halogens or one or more silyl groups to the double bonds.

In a specific embodiment, the m-phenylenevinylene-2,5-disubstituted-p-phenylenevinylene/carbon nanotube mixture is introduced into an epoxy to provide enhanced mechanical properties to the resultant epoxy/carbon nanotube composite. For use in epoxy composites, the m-phenylenevinylene-2,5-disubstituted-p-phenylenevinylene polymer is preferably functionalized with one or more double bonds, one or more epoxy groups, or one or more acid halide groups. In a specific embodiment, a solubilized and/or dispersed alkene-substituted m-phenylenevinylene-2,5-disubstituted-p-phenylenevinylene/carbon nanotube mixture is treated with an epoxidation reagent (e.g., a peroxyacid, such as 3-chloroperoxybenzoic acid) to epoxidize one or more double bonds in the m-phenylenevinylene-2,5-disubstituted-p-phenylenevinylene prior to addition of the epoxidized mixture into the epoxy. In a more specific embodiment, the m-phenylenevinylene-2,5-disubstituted-p-phenylenevinylene is functionalize with $R^1$ and $R^2$ groups that are co-alkenes. In more specific embodiments, the co-alkenes of the $R^1$ and $R^2$ groups of the functionalized m-phenylenevinylene-2,5-disubstituted-p-phenylenevinylene are epoxidized. Useful epoxidizing agents include peroxy acids.

In a specific embodiment, the m-phenylenevinylene-2,5-disubstituted-p-phenylenevinylene/carbon nanotube mixture is introduced into a polyester to provide enhanced mechanical properties to the resultant polyester/carbon nanotube composite. For use in polyester composites, the m-phenylenevinylene-2,5-disubstituted-p-phenylenevinylene polymer is preferably functionalized with one or more epoxy groups, with one or more acid halide groups, with one or more activated esters groups, with one or more carboxylate or carboxylic acid groups or with one or more carboxylic ester groups.

In a specific embodiment, the m-phenylenevinylene-2,5-disubstituted-p-phenylenevinylene/carbon nanotube mixture is introduced into a nylon to provide enhanced mechanical properties to the resultant polyester/carbon nanotube composite. For use in nylon composites, the m-phenylenevinylene-2,5-disubstituted-p-phenylenevinylene polymer is preferably functionalized with one or more acid halide (e.g., acid chloride) groups, or with one or more amine or ammonium ion groups.

Polymer composites of this invention include those which contain a sufficient amount of carbon nanotubes to exhibit a measurable change in mechanical, electrical of thermal properties of the composite compared to the base polymer which contains not carbon nanotubes. More specifically, polymer composites of this invention include those which contain a sufficient amount of carbon nanotubes to exhibit a measurable enhancement in one or more mechanical properties of the polymer composite compared to the base polymer which contains no carbon nanotubes. Mechanical properties which may be enhanced in the polymer composites of this invention include failure load, flexural stress, flexural strain, Young's modulus, tensile strength and toughness. Polymer composites of this invention include those that exhibit a change in elasticity due to the presence of carbon nanotubes. Additionally, polymer composites of this invention include those which contain a sufficient amount of carbon nanotubes to exhibit a measurable increase in conductivity compared to the base polymer which contains no carbon nanotubes. Polymer composite of the invention further include those which contain an amount of carbon nanotubes sufficient to exhibit a measurable difference in thermal conductivity.

The amount of a given substituted m-phenylenevinylene-2,5-disubstituted-p-phenylenevinylene/carbon nanotube mixture added to a given polymer matrix to form a composite material will depend upon the type of polymer and the improvement desired, but will generally range from about 0.1% to about 80% by weight of the composite and all sub-ranges of compositions within this range. More preferably the amount of the m-phenylenevinylene-2,5-disubstituted-p-phenylenevinylene/carbon nanotube mixture added to the polymer to form the composite will range from about 0.5% to about 8% by weight. To minimize cost of the composite, it is preferred to add the lowest amount of carbon nanotubes possible to the composite to achieve a desired improvement. In a given mixture of a substituted m-phenylenevinylene-2,5-disubstituted-p-phenylenevinylene with carbon nanotubes the ratio of m-phenylenevinylene-2,5-disubstituted-p-phenylenevinylene to carbon nanotubes can range in general from 1:10 to about 2:1 and more typically from about 1:5 to about 1:1. In general, it is preferred to minimize the amount of m-phenylenevinylene-2,5-disubstituted-p-phenylenevinylene mixed with carbon nanotubes, without loss of ability to solubilize or disperse the carbon nanotubes in the selected polymer matrix and to achieve the desired composite properties.

The invention provides novel functionalized m-phenylenevinylene-2,5-disubstituted-p-phenylenevinylene polymers, compositions comprising a mixture of these functionalized m-phenylenevinylene-2,5-disubstituted-p-phenylenevinylene polymers and carbon nanotubes (particularly SWNTs), particularly compositions in which the carbon nanotubes are dispersed in a solid or liquid medium by their interaction with the functionalized m-phenylenevinylene-2,5-disubstituted-p-phenylenevinylene polymer. The invention also provides composite materials in which carbon nanotubes, particularly SWNTs are dispersed in a material, for example, a thermoset polymer or resin and more specifically in an epoxy, a polyester or a nylon in the presence of a functionalized m-phenylenevinylene-2,5-disubstituted-p-phenylenevinylene polymer of this invention.

A functionalized m-phenylenevinylene-2,5-disubstituted-p-phenylenevinylene polymer having the repeating unit:

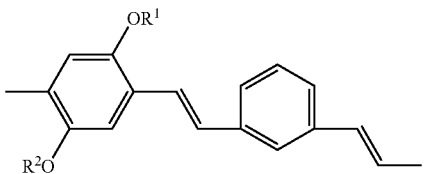

wherein $R^1$ and $R^2$ independently are selected from the group of consisting of an optionally substituted alkenyl group, an alkyl ether group, and an optionally substituted alkyl group wherein the substituents on the alkenyl or alkyl group are selected from the group of consisting of one or more halogens, one or more -COX groups, one or more $-COOR^3$, or $-COO^-$, one or more $-N(R^3)_2$- or $-N(R^3)_3^+$ groups, and one or more $-Si(R^5)_3$ groups wherein X is a halogen or an activated ester group, and each $R^3$ and $R^5$ is independently selected from the group consisting of hydrogen, an alkyl group, an alkenyl group, a halogenated alky group, and a halogenated alkenyl group and wherein at least one of $R^1$ or $R^2$ is a group other than an unsubstituted alkyl group.

The present invention is based at least in part on the use of certain polymers to solubilize and disperse carbon nanotubes in liquids and solids. It has been found that m-phenylenevinylene-2,5-disubstituted-p-phenylenevinylene polymers, particularly those with functionalized side chains, can function to solubilize and disperse carbon nanotubes and can be used to effectively incorporate, carbon nanotubes, particularly SWNTs into polymers to form composite materials. Of particular interest is the incorporation of carbon nanotubes into thermoset and thermoplastic materials to form novel composites. Of particular interest are thermoset and thermoplastic composite materials in which carbon nanotubes are uniformly dispersed.

It is believed that the m-phenylenevinylene-2,5-disubstituted-p-phenylenevinylene polymers of this invention act as a coating for the carbon nanotube (or aggregates of carbon nanotubes), providing a very different surface interface for the nanotubes with its environment. This new interface allows carbon nanotubes to become solvated, or at least uniformly dispersed, in organic solvents.

It is believed that the helical structure of poly (m phenylenevinylene co-2,5-dioctoxy-p phenylenevinylene) (co-2,5-dioctyl PmPV, an exemplary m-phenylenevinylene-2,5-disubstituted-p-phenylenevinylene in which alkyl side chains do not carry functional groups) encourages the polymer to wind itself around both individual SWNTs and multiple SWNT ropes. It is believed that the combination of the m-phenylenevinylene-2,5-disubstituted-p-phenylenevinylene and nanotube forms a polymer/nanotube mixture or aggregate in which polymer is mechanically anchored to the nanotube, but is not chemically bound to it. Because interaction between the m-phenylenevinylene-2,5-disubstituted-p-phenylenevinylene and the SWNTs is purely mechanical, and not the result of bond formation, no incursion into the bond structure of the carbon nanotube occurs.

The present invention relates to functionalization of m-phenylenevinylene-2,5-disubstituted-p-phenylenevinylene, particularly side-chain functionalization, to enhance interaction, improve compatibility with and/or to facilitate chemical binding between the m-phenylenevinylene-2,5-disubstituted-p-phenylenevinylene solubilizing, preferably wrapping about, or coating a carbon nanotube, and a matrix to be reinforced by addition of the functionalized m-phenylenevinylene-2,5-disubstituted-p-phenylenevinylene/carbon nanotube mixture. The m-phenylenevinylene-2,5-disubstituted-p-phenylenevinylene/carbon nanotube mixture may contain various structures, including nanotubes (single nanotubes, ropes or other aggregates of nanotubes) encased, coated or wrapped in the m-phenylenevinylene-2,5-disubstituted-p-phenylenevinylene polymer, nanotubes (or aggregates thereof) partially coated or wrapped in m-phenylenevinylene-2,5-disubstituted-p-phenylenevinylene polymer, free polymer, free nanotubes (or aggregates, e.g., ropes, thereof.

More specifically this invention relates to the development of the chemistry needed for successfully incorporating single walled carbon nanotubes (Bucky tubes) into thermoset and thermoplastic composites in such a way that the resulting composites possess at least some of the extraordinary strength of the carbon nanotubes.

The term aggregate is used generally to refer to two or more molecules which interact and it is used herein in particular to refer to the interaction between m-phenylenevinylene-2,5-disubstituted-p-phenylenevinylene polymers and carbon nanotubes. The interaction is a non-covalent interaction, perhaps based on van der Waals interaction, between one or more polymer molecules and one or more carbon nanotubes or aggregates of carbon nanotubes. It is known that carbon nanotubes can interact to form aggregates, such as ropes. The m-phenylenevinylene-2,5-disubstituted-p-phenylenevinylene polymer/carbon nanotube aggregates of this invention may comprise various aggregate forms or structures. For example, the aggregate may be a carbon nanotube wrapped or at least partially wrapped with one or more m-phenylenevinylene-2,5-disubstituted-p-phenylenevinylene polymer molecules. The aggregate may be a carbon nanotube rope that is at least partially wrapped with one or more m-phenylenevinylene-2,5-disubstituted-p-phenylenevinylene polymers molecules. Aggregation of the m-phenylenevinylene-2,5-disubstituted-p-phenylenevinylene polymer with carbon nanotubes occurs on mixing of the two materials. Aggregation of the m-phenylenevinylene-2,5-disubstituted-p-phenylenevinylene polymer with carbon nanotubes appears to at least in part disrupt aggregation of carbon nanotubes with each other Aggregation of the m-phenylenevinylene-2,5-disubstituted-p-phenylenevinylene polymer with carbon nanotubes facilitates dispersion of carbon nanotubes in non-aqueous liquid and solid medium (e.g., in organic solvents, such as toluene and dichloromethane). In particular, the formation of m-phenylenevinylene-2,5-disubstituted-p-phenylenevinylene/carbon nanotube aggregates facilitates dispersion of the carbon nanotubes in the polymer composites of this invention. Structures of carbon nanotubes and their aggregates with m-phenylenevinylene-2,5-disubstituted-p-phenylenevinylene polymers can be visualized, for example, using scanning electron microscopy (SEM) and/or atom force microscopy methods.

The term functionalized m-phenylenevinylene-2,5-disubstituted-p-phenylenevinylene polymers (or polymer molecules) refers to m-phenylenevinylene-2,5-disubstituted-p-phenylenevinylene polymers which have at least one side chain substituents that is not an unsubstituted alkyl group, e.g., in which the $R^1$ and $R^2$ groups of the polymers are not both unsubstituted alkyl groups. In reference to the side chain substituents on a m-phenylenevinylene-2,5-disubstituted-p-phenylenevinylene polymer it should be understood that functionalization reactions may not result in functionalization of all side chains in the polymer as indicated in chemical formulas. It may be that a relatively small portion of side groups in the polymer is not successfully functionalized. It will be appreciated in the art that minor levels of unfunctionalized side groups in such a polymer will not be significantly detrimental to the use and properties of the polymer as described herein.

The term carbon nanotube is used as broadly herein as the term is used in the art. The term includes, among others, SWNTs and MWNTs as well as aggregates of SWNTs, such as ropes. The term includes carbon nanotubes which may encase or enclosed metal atoms or ions. The term includes SWNTs that are semiconducting SWNTs and those that are metallic SWNTs. The term also generally includes carbon nanotubes which have been derivatized by covalent bonding of functional groups to their surfaces. However, carbon nanotubes that are not derivatized by the formation of covalent bonds to the nanotube surface are preferred for use in this invention. Carbon nanotubes can be formed by various processes, e.g., arc discharge, laser ablation and chemical vapor deposition, and in general carbon nanotubes formed by any process can be employed in this invention. However, carbon nanotubes produced by arc discharge such as those available from CarboLex are currently preferred for use in this invention. Carbon nanotube samples that are currently available contain some level of non-carbon nanotube impurities, which include graphitic carbon, and metal impurities from catalysts used in carbon nanotube preparation. In specific examples herein, as-produced carbon nanotubes have been employed which may contain up to about 50% by volume of such impurities. Purified carbon nanotube samples may also be employed in this invention. As noted herein carbon nanotube samples can be purified to reduce the levels of graphitic carbon and to reduce the levels of metal impurities.

The term base polymer is used herein to refer to the majority polymer component or components of the polymer composites of this invention and is intended to distinguish over m-phenylenevinylene-2,5-disubstituted-p-phenylenevinylene polymers that are employed to form carbon nanotube aggregates. Base polymer represents greater than 50% by weight of the composite and more typically it represents 75% or more by weight of the composite. The base polymer can comprise from about 75% to about 99% by weight of the composite. Base polymers may be a polymer, copolymer or block copolymer, including thermoset and thermoplastic polymers. Preferred base polymers are thermoset polymers, particularly thermoset epoxy and polyester polymers. The term base polymer precursor composition refers to the composition of one or more precursors of the base polymer or polymers that are used to generate the structure of the base polymer molecules of the composites of this invention. It will be appreciated that the number and type of precursors in such compositions will depend upon the type of base polymer that is to be formed. Polymer precursors include among others one or more monomers. For example, epoxy precursors generally include epoxides (oxiranes) and polyhydroxy compounds, such as diols. For example, nylon precursors generally include chloride and a diamine, such as hexane-1,6-diamine. Polymer precursor compositions can contain crosslinking agents, catalysts and reagents which function for polymerization.

The term thermoset is used broadly as it is understood in the art and refers to polymers that are cured or set into a form which is retained to the polymers decomposition temperature without melting. In contrast, a thermoplastic polymer has a melting or liquefying temperature. Thermoset polymers are insoluble in their cured stated while a thermoplastic polymer may be soluble in one or more solvents.

The terms alkyl and alkenyl are used as they are generally used in the art and include straight-chain, branched and cyclic alkyl and alkenyl groups. Alkenyl groups may contain one or more double bonds and the double bonds may be in the cis or transconfiguration.

Functionalized m-phenylenevinylene-2,5-disubstituted-p-phenylenevinylene polymers include those that contain reactive groups and latent reactive groups that react under selected conditions with one or more functional groups of the base polymer or of the precursors employed to make the base polymer. Functionalized m-phenylenevinylene-2,5-disubstituted-p-phenylenevinylene polymers may for example contain one or more side chains that carry an activated ester groups —CO-OZ, where the Z group is a good leaving group that facilitates or enhances reactivity at the carbonyl group of the ester group. Activated ester groups and acid halide groups are examples of reactive groups.

Various methods for forming the base polymers of this invention are known in the art and such art-known methods can be readily employed or readily adapted to the practice of this invention in view of guidance herein. The selection of base polymer precursors for forming a selected base polymer is well-known in the art. In specific embodiments, the functionalization of the m-phenylenevinylene-2,5-disubstituted-p-phenylenevinylene polymers of this invention is chosen for compatibility or reaction with one or more functional groups of the base polymer precursors or functional groups of the base polymer.

The properties of the polymer composite can be adjusted by adjusting the amount of carbon nanotubes added to the composite. The properties of the composite can be adjusted by selection of the type of functionalization on the side chains of the m-phenylenevinylene-2,5-disubstituted-p-phenylenevinylene polymers used in the formation of the composite. The properties of the composites can be further adjusted by the employing combinations of m-phenylenevinylene-2,5-disubstituted-p-phenylenevinylene polymers with different functionalization or by employing a combination of functionalized and non-functionalized m-phenylenevinylene-2,5-disubstituted-p-phenylenevinylene polymers.

The m-phenylenevinylene-2,5-disubstituted-p-phenylenevinylene/carbon nanotube composites of this invention are intended for use in high performance structural components in a host of different applications and must be versatile enough to accommodate a wide variety of manufacturing techniques. In a specific example, an epoxy fabrication method called Resin Transfer Molding (RTM) can be used for producing a wide variety of shapes of composite materials, while also allowing the upscale production at competitive costs. [M. M. Gauthier, Editor. 1995]

In one embodiment, placing various functional groups on the side chains of a m-phenylenevinylene-2,5-disubstituted-p-phenylenevinylene polymer makes it possible to introduce covalent bonding between the m-phenylenevinylene-2,5-disubstituted-p-phenylenevinylene and the matrix into which the m-phenylenevinylene-2,5-disubstituted-p-phenylenevinylene/carbon nanotube mixture is to be introduced Covalent bonding between the m-phenylenevinylene-2,5-disubstituted-p-phenylenevinylene associated with a carbon nanotube and the matrix of the composite material will provide enhanced strength in the final composites by maximizing the load transfer capabilities of the composites matrix to the reinforcing carbon nanotubes.

The mechanical properties of composites comprising m-phenylenevinylene-2,5-disubstituted-p-phenylenevinylene/carbon nanotube mixtures can be enhanced. Mechanical properties that can be improved include failure load (the load being applied when the composite sample fractured) and Young's Modulus (modulus of elasticity).

Introduction of selected functional groups of the m-phenylenevinylene-2,5-disubstituted-p-phenylenevinylene appropriate for beneficial interaction with the composite matrix will help to disperse the m-phenylenevinylene-2,5-disubstituted-p-phenylenevinylene/carbon nanotube mixture in the composite, and will enhance the interaction of the m-phenylenevinylene-2,5-disubstituted-p-phenylenevinylene with the matrix and preferably allow for chemical bonding between the m-phenylenevinylene-2,5-disubstituted-p-phenylenevinylene side chains and the matrix. For example, the introduction of epoxy and amine on the m-phenylenevinylene-2,5-disubstituted-p-phenylenevinylene side chains provides for a good interface and compatibility with epoxy resins and hardeners resulting in the formation of improved epoxy composites with increased toughness or other improved mechanical properties.

However, the functionalization of the side chains in of the m-phenylenevinylene-2,5-disubstituted-p-phenylenevinylene must be compatible with the chemistry involved in making the polymer, must be compatible with interaction of the m-phenylenevinylene-2,5-disubstituted-p-phenylenevinylene with the carbon nanotube needed to facilitate solubilization or dispersion of the carbon nanotube and it must be compatible with introduction of the m-phenylenevinylene-2,5-disubstituted-p-phenylenevinylene/nanotube mixture into the composite (e.g., it must allow formation of the composite.). In a specific embodiment, the functional groups on the side chain of the m-phenylenevinylene-2,5-disubstituted-p-phenylenevinylene is a group that will covalently react to chemically bind within the forming matrix of the composite. For example, the functional group preferably forms covalent bonds with the matrix of the composite.

Synthesis of the alkene-substituted m-phenylenevinylene-2,5-disubstituted-p-phenylenevinylene is illustrated in Scheme 1 in reactions 1, 2A, 2B, 2C, 3A/B, 4A/B and 5A/B (Steps 4 and 5 are the polymerization steps). One of the primary concerns in this synthesis is to functionalize the side chains of the m-phenylenevinylene-2,5-disubstituted-p-phenylenevinylene without interfering with the chemistry involved in making the m-phenylenevinylene-2,5-disubstituted-p-phenylenevinylene polymer.

Substituted m-phenylenevinylene-2,5-disubstituted-p-phenylenevinylene of this invention can be synthesized in view of the descriptions and guidance provided herein in combination with methods and techniques which are well known in the art.

The mechanical and electrical properties of polymer composites of this invention containing carbon nanotubes can be assessed employing methods that are well-known in the art including those methods specifically exemplified herein. The properties of polymer composites of this invention containing m-phenylenevinylene-2,5-disubstituted-p-phenylenevinylene and carbon nanotubes can be compared to the properties of analogous polymers which do not contain carbon nanotubes, and/or m-phenylenevinylene-2,5-disubstituted-p-phenylenevinylene to assess changes and improvements in those properties.

In specific embodiments, polymer composites of this invention containing substituted m-phenylenevinylene-2,5-disubstituted-p-phenylenevinylene and carbon nanotubes will exhibit enhanced toughness compared to analogous polymers which do not contain carbon nanotubes and/or m-phenylenevinylene-2,5-disubstituted-p-phenylenevinylene.

In other specific embodiments, polymer composites of this invention containing substituted m-phenylenevinylene-2,5-disubstituted-p-phenylenevinylene and carbon nanotubes will exhibit electrical properties (e.g., conductivity) different from analogous polymers which do not contain carbon nanotubes and/or m-phenylenevinylene-2,5-disubstituted-p-phenylenevinylene.

Single-walled carbon nanotubes are commercially available, but as disclosed herein it is preferred in some cases to further purify the commercial materials before use in the preparation of polymer composites of this invention. SWNTs can be prepared by methods known in the art, for example, arc discharge methods (Iijima Nature (1993) 363: 603; Lambert et al. (1994) Chem. Phys. Lett, 226:364). Laser vaporization methods are reported to provide higher yields of SWNTs. (U.S. Pat. No. 6,183,714). Published PCT applications US99/25702 and PCT US99/21367 relate to other methods for making SWNTs. Published PCT application US02/40914 reports a low temperature method for synthesis of SWNTs. Various methods for purification of carbon nanotubes have been reported. For example, see Zhao et al. J. Amer. Chem. Soc. (2001) 123:11673-11677 and references cited therein.

It is understood in the art that a polymer typically contains polymerized chains of different lengths, i.e. different numbers of repeating units. In certain polymers polymerized chains of monomers can be crosslinked. m-Phenylenevinylene-2,5-disubstituted-p-phenylenevinylene polymers of this invention have n greater than 5, greater than 10, greater than 20 or greater than 50. The number of repeating units, n, in the substituted m-phenylenevinylene-2,5-disubstituted-p-phenylenevinylene can also be varied. In general, the substituted m-phenylenevinylene-2,5-disubstituted-p-phenylenevinylene used in this invention has an average molecular weight ranging from about 2,000 Daltons to about 100,000 Daltons.

When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

In general the terms and phrases used herein have their broadest art-recognized meaning, which can be found by reference to standard texts, journal references and contexts known to those skilled in the art. Any definitions provided are provided to clarify the specific use of these terms and phrases in the context of the invention.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination.

The following examples are provided to further illustrate the invention and are not intended to limit the scope of the invention.

THE EXAMPLES

Example 1

Synthetic Reactions for Preparation of Alkene-Substituted m-phenylenevinylene-2,5-disubstituted-p-phenylenevinylene (See Scheme 1)

Reaction Forming the Step 1 Product

The reaction is carried out by adding two equivalents of 8-bromo-1-octene along with one equivalent of hydroquinone to a 3-neck round bottom flask (RBF). To this is added 10 mL of DMF for each gram of hydroquinone used. This solution is heated to 60 EC using an oil bath, and stirred using a magnetic stir bar and stirrer. When the temperature reaches 60° C., a vacuum is applied to the reaction flask to remove any $O_2$ from the reacting reagents and then the flask is flushed with argon. This is done 3 or 4 times. The reaction solution at this stage is clear and colorless. While the reaction flask is being flushed with argon to prevent oxygen from entering, powdered KOH (2 equivalents) is added to the flask via a funnel. The funnel is then rinsed with a small amount of DMF. Upon addition of KOH, the reaction mixture turns a bright yellow. The reaction flask is purged of residual $O_2$ by first being evacuated, followed by flushing with argon. This is up to nine times, so that the reaction mixture turns from bright yellow to a pale pink color. The reaction proceeds under argon for approximately 1 hour at a temperature of 60° C. A solution of equal parts acetic acid and DMF is added to the reaction mixture to neutralize any residual KOH left from the reaction.

To collect the Step 1 product, the DMF solution is decanted from the precipitate remaining in the reaction flask (mostly potassium bromide) and transferred into a large sample jar with a lid. The DMF solution is placed in a freezer overnight to cause the Step 1 product to precipitate out. The precipitate is collected using vacuum filtration, and left to air dry. It is important to avoid contact with water which can cause the generation of undesired impurities.

Scheme 1:

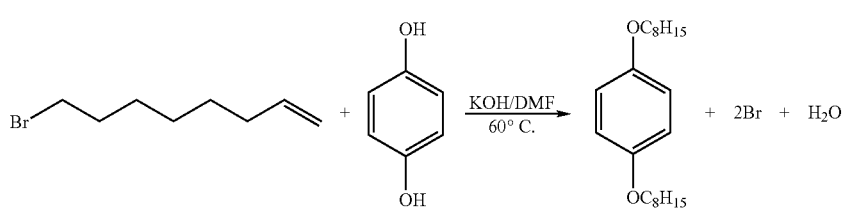

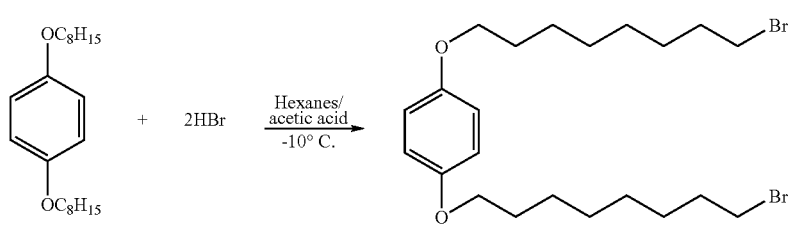

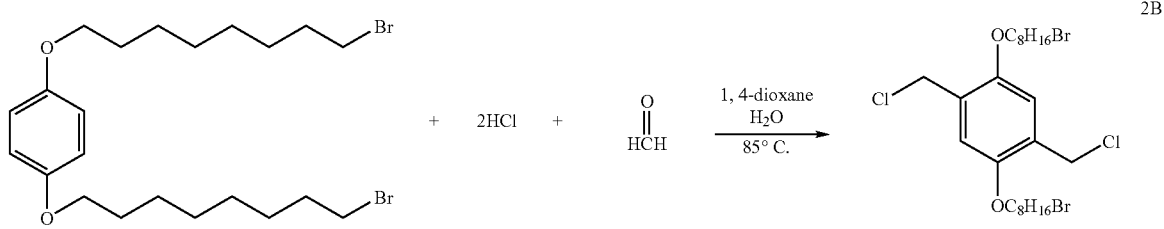

-continued
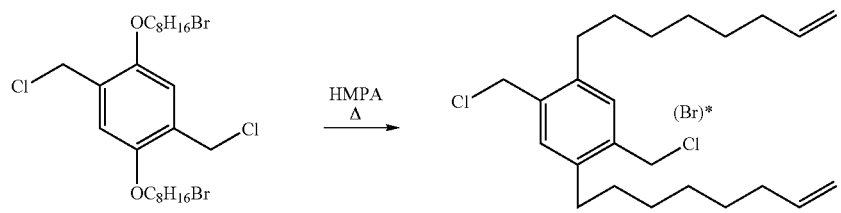
*There is some replacement of Cl with Br
2C
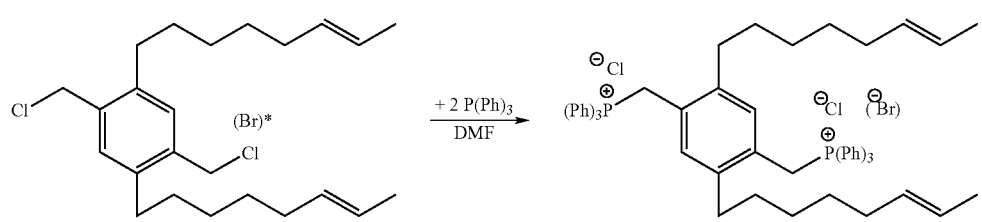
3A
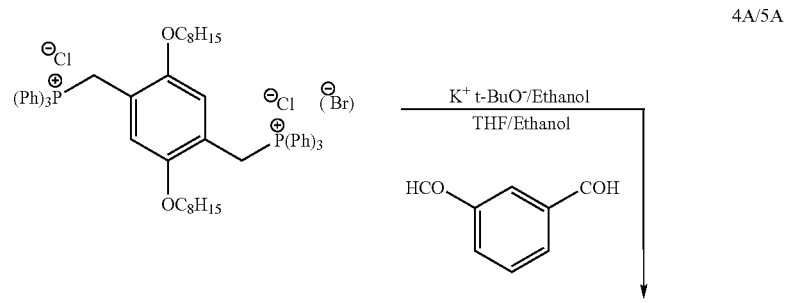
4A/5A
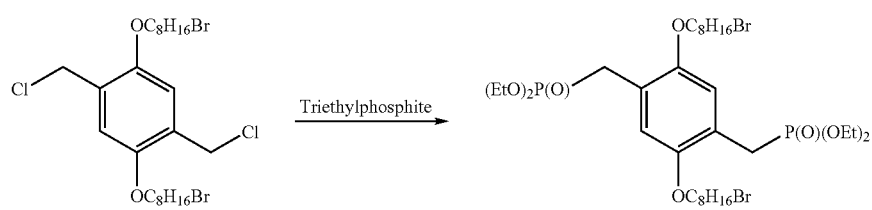
3B
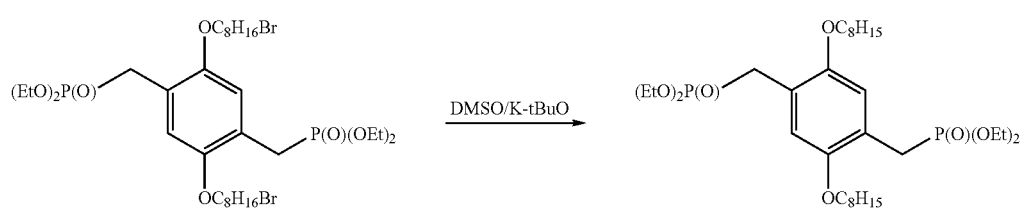
Mixture of olefin side chains, containing ϖ-olefin -continued

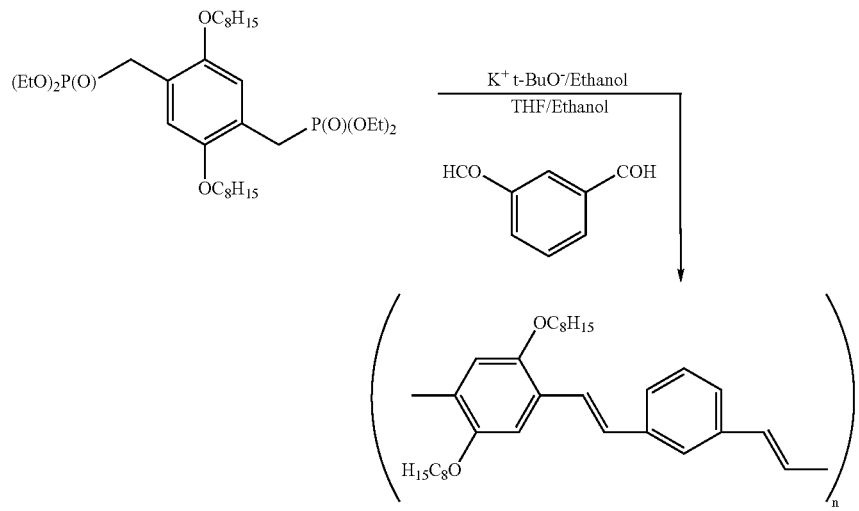

Reaction Forming the Step 2A Product

A 2 g sample of the Step 1 product is dissolved in 125 mL of hexanes. Another 50 mL of hexanes, 16 mL of glacial acetic acid and 8 mL of HBR (33% by weight) in acetic acid is added to a jacketed 300 mL 3-neck RBF. The flask is cooled to −10° C. The hexanes/acetic acid mixture phases are vigorously mixed by stirring with a mechanical stirrer. The hexanes solution containing the Step 1 product is then added to the stirred/cooled hexanes/acetic acid mixture. After this addition, the reaction mixture is stirred for about 1 hour at −10° C. A white precipitate is formed in the reaction mixture.

To recover the Step 2A product, hexanes are poured off of the reaction mixture (warmed to RT) and the remaining solid is dissolved in dichloromethane. The dichloromethane solution is transferred to a separatory funnel and washed three times with DI H₂O until the pH of the water is neutral, then the dichloromethane layer is collected. Solvent is removed, leaving the Step 2A product. No 7-Br substitution was detected by NMR methods.

Reaction Forming Step 2B Product

To carry out this reaction, a reaction setup was designed to allow the reaction to run continuously unsupervised with recirculation of HCl gas for 40 hrs or more. A 3-neck reaction flask is equipped with a gas dispersion tube connected in a tubing loop to another neck of the reaction flask via a peristaltic pump to provide recirculation of HCl gas at constant pressure. The reaction flask is also equipped with a gas inlet for introduction of HCl gas into the flask via a variable pressure check valve (3 PSI, with HCl tank set at 4 PSI release) or HCl removal through a pressure relief valve (8 PSI). The HCl removal line is connected to an aqueous HCl trap through a T-valve which is also connected to an argon tank (set at 5 PSI release) via a needle valve for argon flow control and check valve (⅓ PSI) to flow argon through the aqueous HCl trap. A gas outlet is provided for the trap through a bubbler. During the reaction argon is flowing through the trap and bubbler at a slow, but steady rate. The check valve in the argon supply line prevents backflow into the argon tank. The HCl tank is set to provide 4 PSI constant pressure to the reaction flask. The check valve provided in the HCl supply line prevents back flow into the HCl tank. HCl is recirculated back into the reaction mixture through the gas dispersion tube employing the peristaltic pump. If pressure in the reaction flask rises above 8 PSI, the variable pressure relief valve in between the reaction flask and the HCl trap will open to allow overflow of gas into the trap.

Step 2A product (2 g) dissolved in 48 mL 1,4-dioxane is added to the 3-neck round-bottomed flask (300 mL) of the setup described above via funnel and is rinsed with the 1,4-dioxane. The flask is equipped with a magnetic stirrer and placed in an oil bath. Formaldehyde (10 mL, 37% aqueous solution of formaldehyde) is added to the reaction flask. The reaction mixture is heated to about 60° C. When the reaction mixture reaches this temperature, a 4M hydrochloric acid solution (7.1 mL) is added to the reaction flask. Thereafter hydrogen chloride gas is bubbled through the reaction mixture through the gas dispersion tube. The HCl gas is recirculated through the reaction mixture as described above continuously over approximately 40 hours. When the reaction mixture is cooled to RT a solid forms.

To recover the Step 2B product, dichloromethane (CH₂Cl₂) is added to the reaction flask to dissolve the solid product, then the entire contents of the reaction flask are transferred to a separatory funnel. The CH₂Cl₂ layer containing the reaction product is washed with DI H₂O several times (until the water exhibits neutral pH), and then collected into a beaker. The CH₂Cl² solvent is then removed. When the recovered solid is completely dry, it can be used with further purification or can be further purified by recrystallization from petroleum ether.

Reaction Forming Step 2C Product

Step 2B product is combined with hexamethylphosphoramide (HMPA) to form the Step 2C product.

Step 2B product (0.5 g) is added with 10 mL HMPA to a 50 mL 3-neck RBF. Magnetic stirring is turned on and the flask is heated. The flask is evacuated and then the system is flushed with argon. This argon flush is repeated 2-3 more times to remove oxygen. The reaction flask is heated to 75° C. and left for several days under vacuum at this temperature. A solid forms on cooling of the reaction mixture.

To recover Step 2C product, 10 mL of hexane is added to the reaction flask, which is then shaken vigorously. The mixture is then transferred to a small separatory funnel. The hexane/HMPA mixture is washed with DI H₂O several times (until the water exhibits neutral pH), and the hexane layer is collected and the solvent is removed to provide the Step 2C product.

Reaction Forming Step 3A Phosphonate

The Step 2C product (1 mol) is combined with triethylphosphite (3 mol) to form Step 3 product.

The Step 2C is added to a 50-100 mL (depending on quantity) 3-neck RBF that is equipped with a reflux condenser. The reaction flask is first heated (to melt the solid product) and the water to the condenser is turned on. After the solid has completely melted, the flask is evacuated and flushed with argon several times to remove oxygen. A vacuum is pulled again to evacuate the reaction flask in order to add the triethylphosphite via syringe. After triethylphosphite is added, the system is again flushed with argon. As the system is heated to 150° C., the system is evacuated and flushed with argon periodically. When the reaction flask reaches 150° C., a slight vacuum is pulled on the recovery flask. The reaction runs approximately 4 hrs at 150° C. A vacuum is pulled every 5-15 min on the recovery flask for the first hour, then every 30 min for the remainder of the reaction. After the reaction has run for 4 hrs, a full vacuum is applied to the recovery flask to remove any excess triethylphosphite.

To recover the Step 3 product, extractions with hexanes or $CH_2Cl_2$ (washed with DI $H_2O$) are used. The product seems to dissolve better in $CH_2Cl_2$, although it is possible to extract with hexanes. The organic layer is collected and the solvent is evaporated in order to precipitate out the product.

Dehydrohalogenation of Step 3 Phosphonate Product

To a flask containing the Step 3 product, a minimal amount of dimethyl sulfoxide (DMSO) is added in order to mix the contents. The flask is evacuated, then purged with argon three times. Potassium tert-butoxide is added in a 2:1 molar ratio to the amount of Step 3 product. This addition is done slowly while the reaction flask is submerged in an ice bath. Once the flask is resealed, it is placed under vacuum. When flask contents began to solidify, it was removed from the ice bath and allowed to run for about 2 hours at room temperature.

To collect this product, first the basic reaction solution must be neutralized, for example using 4M HCl. Water is then added to the mixture and the solution is decanted away from any remaining solid in the flask. The product is then extracted from this solution using toluene. Toluene is removed to provide the product. The toluene layer may be washed with water prior to solvent removal, but water and toluene can form an emulsion which can be problematic.

Reaction Forming Step 3A Phosphonium Salt

Triphenylphosphine and the Step 2C product are added in a 2:1 molar ratio to a RBF equipped with a Vigurex column. The funnel is then rinsed with DMF to ensure that most of the reagents are able to participate in the reaction. Heat and stirring are turned on before the flask is evacuated by vacuum and then purged with argon (two times) and allowed to remain in an argon atmosphere. When the temperature reaches 100° C., the flask is again evacuated and purged (2×). This was also done when the temperature reached 120° C. and 2 hours into the reaction. The reaction is allowed to proceed for 18 hours at 120-130° C.

To collect this product the temperature of the reaction mixture is reduced to 50° C. and the RBF is equipped with a distillation head condenser, vacuum adapter, and recovery flask. This allows the DMF to be removed from the product.

Reaction Forming m-phenylenevinylene-2,5-disubstituted-p-phenylenevinylene from Phosphonium Salt (Steps 4A and 5A)

The Step 3 phosphonium salt (5.5 g (5.8 mmol)) is placed in a RBF equipped with an addition funnel and stir bar. To the addition funnel, potassium tert-butoxide is added in an amount that is slightly less than twice the molar amount of the Step 3 product. Ethanol (40 mL) is also added to the funnel, which must then be heated with a heat gun in order for all of the potassium salt to dissolve. Next, the flask is evacuated in order to cannulate about 75 mL of a dried 50/50 (v/v) mixture of THF/ethanol into the flask. Once all of the Step 3 product has dissolved, isophthalaldehyde is added to the flask while argon is flowing through. The amount of isophthalaldehyde added is just less than the molar equivalent of the Step 3 product. Finally, the potassium tert-butoxide solution is then added to the flask dropwise, while the reaction solution is stirred in an argon atmosphere. The reaction is stirred for 4-5 days at room temperature. The product is extracted from the reaction mixture with dichloromethane, and the resulting or is washed several times with de-ionized water. The dichloromethane is then left to evaporate, leaving our polymer.

Reaction Forming m-phenylenevinylene-2,5-disubstituted-p-phenylenevinylene from Phosphonate (Steps 4B and 5B)

The dehydrohalogenated Step 3B product made using the triethylphosphite version of Step 3 is dissolved into DMSO and placed into a 3-neck RBF and started stirring. Two addition funnels were placed on the round bottom flask. One of these contained isophthalaldehyde, just less than the molar equivalent of Step 3B product, in 30 mL DMSO. The other contains potassium tert-butoxide in 80 mL of DMSO; just less than 2:1 molar ratio of potassium tert-butoxide to the Step 3B product. The entire system was evacuated, flushed briefly with argon, then evacuated once again. The reaction vessel was heated to 130° C., while argon was left to flow slowly into the system (a gas escape needle was placed in a septa one of the addition funnels to keep pressure from building up). When the temperature reached 130° C., the isophthalaldehyde and potassium tert-butoxide solutions were added dropwise in a 2:3 ratio, respectively for the first half of the isophthalaldehyde solution, and then the potassium tert-butoxide was added at a faster rate for the remainder. After all reagents had been added to the RBF, the reaction was allowed to proceed for about 3 hours between 120-130° C. The product was collected by extracting it from the reaction solution using dichloromethane and then washing the dichloromethane with water.

Example 2

Purification of Carbon Nanotubes

Commerically available carbon nanotubes (CarboLex AP grade) may contain graphite and metal catalytst impurities. Graphite impuriteis may be burned-off employing methods such as that described by Eklund. CarboLex carbon nanotubes are made using the arc-discharge method and may contain Ni/Y catalyst impurities that are used in making the nanotubes. A procedure similar to one reported by Eklund can be used to remove these impurities.

In a 50 mL round bottom flask, 30 ml of 4M HCl was added over carbon nanotubes. The flask was equipped with a condenser and a stir bar and placed in an oil bath. The condenser was closed with a septa at the top. While the reaction mixture was heated a needle was put in the septa to prevent pressure accumulation. When the reaction mixture reached a temperature of about 95° C., the solution became black/gray and contained suspended particles. When stirring was stopped these particles settled to the bottom and sides of the flask. The reaction was heated to boiling (usually between 110 and 115° C.). Once the reaction was boiling we removed the needle from the septa and turned down the temperature to 110° C. We let the reaction reflux anywhere from several hours to several days.

The solution became clear green (with NiCl$_2$) and nanotubes settled on the bottom of the flask when the stirring was stopped. After removing most of the green solution, DI water was added to dilute the remaining solution, which was then removed as well. In this way residual acid was removed.

The nanotubes were rinsed with water until no color remained in the wash. To remove the residual water acetone was added and allowed to evaporate to dryness. The nanotubes were then dried under vacuum.

Other methods that are known in the art to remove graphite (amorphous carbon) and metals can be employed in the practice of this invention.

Example 3

Making the m-phenylenevinylene-2,5-disubstituted-p-phenylenevinylene/SWNT Mixture To make the m-phenylenevinylene-2,5-disubstituted-p-phenylenevinylene/SWNT composite, m-phenylenevinylene-2,5-disubstituted-p-phenylenevinylene, usually around the same weight as the weight of SWNTs to be used, is dissolved in toluene. SWNTs are added to this solution and then it is sonicated in an sonic bath for around an hour to obtain a uniform dispersion. If purified nanotubes are used, less time is needed to get a uniform dispersion of the nanotubes. Typical amounts used are 10 mL of toluene, 0.20 g of m-phenylenevinylene-2,5-disubstituted-p-phenylenevinylene and 0.20 g of SWNT. The toluene is then removed from this mixture and the m-phenylenevinylene-2,5-disubstituted-p-phenylenevinylene/SWNT mixture is dispersed in dichloromethane. The m-phenylenevinylene-2,5-disubstituted-p-phenylenevinylene/SWNT mixture can be dispersed in other solvents as needed. The solvent m-phenylenevinylene-2,5-disubstituted-p-phenylenevinylene/SWNT dispersion can be added to a polymer precursor or monomer for introduction into a polymer matrix on polymerization of the polymer.

Example 4

Making the m-phenylenevinylene-2,5-disubstituted-p-phenylenevinylene/SWNT/Epoxy Composites The m-phenylenevinylene-2,5-disubstituted-p-phenylenevinylene/SWNTs mixture dispersed in dichloromethane is added to an epoxy. The mixture is slowly put under vacuum while it is being stirred and gradually heated to about 60° C. or 70° C. Art-known additives may also be added to the mixture. Once all of the dichloromethane has been removed and the nanotubes are uniformly dispersed, epoxy hardener is added to the mixture and it is again mixed to harden and can be cured as known in the art.

Epoxy composites can be formed by injection molding by following the listed procedure and taking care after addition of the hardener to only allow it to mix for several minutes so that it does not begin to solidify.

The thoroughly mixed m-phenylenevinylene-2,5-disubstituted-p-phenylenevinylene/SWNT/Epoxy and hardener combination is then injected into a mold using a syringe. The mold is sealed and then placed in a furnace where it is heated to its initial curing temperature (usually around 150° C.) where it is cured for around 2 hours and then heated to its final curing temperature (usually around 175° C.) and left to cure for around 4 hours. After cooling to room temperature the mold is opened and the composite removed. The cured epoxy composite is then subjected to a post cure step where it is again heated to its post curing temperature (usually between 175 and 200° C.) to cure for between 4 to 7 hours. The composite sample is again cooled to room temperature and is then ready for testing.

In preparing control epoxy samples 10 mL of epoxy resin from CEBA (GY 6008) was used. To this 7 mL of dicholoromethane was added. The reaction vessel was preheated to between 60 to 75° C. The mixture was allowed to stir under vacuum for 90 minutes. After this 4 mL of hardener also from CEBA (2954) was added. This mixture was allowed to stir under vacuum for another 30 minutes. The resin and hardener mixture was then put in the various molds. The sample was cured at 150 EC for 2 hours and then at 180 EC for another 4 hours.

To prepare samples of epoxy containing m-phenylenevinylene-2,5-disubstituted-p-phenylenevinylene and carbon nanotubes the following procedure can be used. PmPV or functionalized PmPV (0.30 g) is mixed with 0.59 g AP-grade SWNT from Carbolex and 15 ml of toluene. SWNTs are first added to toluene in a test tube, then the PmPV or functionalized m-phenylenevinylene-2,5-disubstituted-p-phenylenevinylene are added to the toluene/SWNT mixture. The mixture is sonicated for 30 minutes. Toluene is then removed and replaced with 7 ml of dicholoromethane. Other solvents can be employed to replace the toluene.

Epoxy resin (10 mL, GY 6008) is combined with the m-phenylenevinylene-2,5-disubstituted-p-phenylenevinylene/SWNT/nanotube to a preheated reaction vessel equipped with a stir bar. This placed under vacuum for 1 hour and 35 minutes. After removal of all of the dichloromethane we added 4 ml of hardener (2954), and this was kept under vacuum while heated to around 60 EC for 16 minutes. The mixture was then placed in the various molds for curing. The cure temperatures are 150° C. for 2 hours and 175° C. for another 4 hours. Care must be taken in curing of the composite to avoid temperatures that will degrade the m-phenylenevinylene-2,5-disubstituted-p-phenylenevinylene polymer.

Example 5

Preparation of Epoxy Composites Containing Aggregates of Functionalized m-phenylenevinylene-2,5-disubstituted-p-phenylenevinylene Polymers with Carbon Nanotubes Making the Olefinated m-PHENYLENEVINYLENE-2,5-DISUBSTITUTED-p-PHENYLENEVINYLENE/SWNT Aggregate To make the olefinated m-phenylenevinylene-2,5-disubstituted-p-phenylenevinylene/SWNT composite the olefinated m-phenylenevinylene-2,5-disubstituted-p-phenylenevinylene is dissolved (the weight of m-phenylenevinylene-2,5-disubstituted-p-phenylenevinylene used is about the same as the weight of SWNTs to be used) in toluene. The SWNTs are added to this solution and then it is sonicated in a sonic bath for around an hour. If purified nanotubes are used less time is needed to get a uniform dispersion of the nanotubes. Typical amounts used are 10 mL of toluene, 0.20 g of m-phenylenevinylene-2,5-disubstituted-p-phenylenevinylene and 0.20 g of SWNT. The toluene is then removed from this mixture and the olefinated m-phenylenevinylene-2,5-disubstituted-p-phenylenevinylene/SWNT aggregate is dispersed in dichloromethane.

Epoxidation (Fuctionalization) of the Olefin on the m-phenylenevinylene-2,5-disubstituted-p-phenylenevinylene Side Chains To the olefinated m-phenylenevinylene-2,5-disubstituted-p-phenylenevinylene/SWNT dispersed in dichloromethane is added an equivalent molar amount of 3-chloroperpxybenzoic acid to that of the amount of olefin functional groups on the m-phenylenevinylene-2,5-disubstituted-p-phenylenevinylene side chains and the mixture is stirred for about 30 minutes. The dichloromethane is then removed immediately under vacuum and the resulting epoxidized m-phenylenevinylene-2,5-disubstituted-p-phenylenevinylene/SWNT composite is then washed several times with methanol to remove the residual 3-chloroperpxybenzoic acid along with the 3-chlorobenzoic acid that had formed during the reaction.

Making the Epoxidized PmPV m-phenylenevinylene-2,5-disubstituted-p-phenylenevinylene/SWNT/Epoxy Composites The epoxidized m-phenylenevinylene-2,5-disubstituted-p-phenylenevinylene/SWNTs mixture is again introduced into dichloromethane and then added to an epoxy resin in a special mixing container that allows us to stir and heat the mixture while under vacuum. The mixture is slowly put under vacuum while it is being stirred and gradually heated to around 60 or 70° C. Once all of the dichloromethane has been removed and the nanotubes are uniformly dispersed, hardener is added to the mixture and it is again mixed, this time taking care to only allow it to mix for several minutes before placing it in the mold so that it does not begin to solidify.

The thoroughly mixed fuctionalized m-phenylenevinylene-2,5-disubstituted-p-phenylenevinylene/SWNT/Epoxy/Hardener liquid is then injected into a mold using a syringe. The mold is sealed and then placed in a furnace where it is heated to its initial curing temperature (usually around 150° C.) where it is cured for around 2 hours and then heated to its final curing temperature (usually around 175° C.) and left to cure for around 4 hours. After cooling to room temperature the mold is opened and the composite removed. The cured epoxy composite then undergoes a post cure where it is again heated to its post curing temperature of 175° C. to cure for between 4 to 7 hours. The composite sample is again cooled to room temperature and is then ready for testing.

Example 6

Measuring the Mechanical Properties of the m-phenylenevinylene-2,5-disubstituted-p-phenylenevinylene/SWNT/Epoxy Composites Measuring the Failure Load, Flexural Stress, and Flexural Strain In addition to providing the failure load (i.e., the load at which samples break), data collected from a flexural stress test is used for calculating the flexural stress, the flexural strain, and the Young's modulus or modules of elasticity in bending. Before performing the flexural stress test, the thickness, the width, and length of the test sample must be measured to calculate the support span to be used with a particular sample. All of these measurements are done using a caliper. It is very important that the span ratio between the supports remains constant for each of the individual samples. A span ratio of 16 can be used for example.

The support span, L, is calculated using the following equation:

$$16d=L$$

where d is the thickness of the sample. The flexural stress test is then preformed by using a specific displacement speed decided upon by the operator, while the time and applied load are recorded automatically by an Instron Universal Materials Testing Machine (Instron, Canton, Mass.)

Flexural stress may be calculated for any given load applied to the sample during the flexural stress test using the formula:

$$(3PL)/(2bd2)=\text{stress}$$

where L=the support span, P=the load at a given point on the load-deflection curve, b=the width of the sample, and d=the thickness of the sample.

The flexural strain can then be calculated using the formula:

$$(6Dd)/L2=\text{strain}$$

where D=the maximum deflection at the center of the sample, d=the thickness of the sample and L=the support span.

Estimating Young's Modulus (Modulus of Elasticity During Bending EB) Using the INSTRON The Young's modulus for composites can be obtained indirectly by calculations using data collected during the flexural stress tests done on the samples. Direct methods for measurement of Young's modulus of a sample are known in the art and can be employed. For example, the measurement can be made using a dtrain gauge.

To ensure that the indirect method was a reliable, the Young's modulus of several samples were measured directly using a strain gauge and then compared to values calculated for that sample. Both methods for determining the Young's modulus are described below.

To calculate the Young's modulus, the slope of the original straight-line portion of the load-deflection curve generated from the data collected on the INSTRON is measured. The Young's modulus (EB) is calculated using the slope of the Load-Deflection curve in the following formula, $$EB=(L3m)/(4bd3)$$

where m=the slope obtained from the load-deflection curve, L=the support span, b=the width of the sample, and d=the thickness of the sample.

Measuring the EB (Modulus of Elasticity or Young's Modulus) Using a Strain Gauge The first step in using a strain gauge to measure the Young's modulus is to apply the gauge to the sample. The procedure for doing this is as follows:

The basic steps to be followed for the bonding of strain gauges are:

1. Degrease the gauging area using isopropyl alcohol as the solvent.

2. Use dry 220- or 320-grit silicon-carbide paper to remove any surface scale or oxide. The final abrading is done using 320- or 400-grit silicon-carbide paper, followed by wiping dry the surface with a gauze sponge. At this time alignment marks for the strain gauge should be made so that the actual gauge is in the center of the sample. Continue to apply conditioner and scrub with cotton-tipped applicators until the clean tip no longer becomes discolored. Remove all residue and conditioner by again wiping thoroughly with a gauze sponge.

3. Apply a liberal amount of neutralizer and scrub with cotton-tipped applicator.

4. Place the gauge, bonding side down, onto a clean glass plate or empty gauge box. If a solder terminal is to be incorporated, position it next to the gauge. While holding the gauge in position with a Mylar envelope, place a piece of tape over about half of the gauge tabs along with the entire terminal.

5. Remove the gauge/tape/terminal assembly by peeling tape at a shallow angle (about 30 degrees) and transferring it onto the specimen. Make sure the gauge alignment marks coincide with specimen layout lines.

6. Lift at the shallow angle, peel back one end of the taped assembly so as to raise both gauge and terminal. Coat the gauge backing, terminal, and specimen surface with a thin layer of adhesive (M-Bond 43-B, 600, and 610). Also coat the foil side of open-faced gages. Do not allow the adhesive applicator to touch the tape mastic. Permit adhesive to air-dry, by solvent evaporation, for 5-30 minutes at room temperature.

7. Return gauge/terminal assembly to its original position over layout marks. Use only enough pressure to allow assembly to be tacked down. Use a thick silicone gum pad and a metal backup plate slightly larger than the gauge/terminal areas, and carefully center these on both sides of the sample. Use spring clamps to apply pressure during the cure cycle. Place clamped gauge/specimen into a cool oven and raise temperature to the desired curing level at 3 to 11 degrees C. per minute.

A ramp rate of 5° C./minute to get to a first curing temperature of 120° C., which had a dwell time of 3 hours. The temperature was raised to 150° C. where the dwell time was 2 hours, again using a ramp rate of 5° C./minute.

The three wires coming off the strain gauge are connected to an amplifier that can then read the strain value during the course of the experiment. This information is combined with the corresponding stress being applied to the sample by the INSRTON at the same moment to plot a stress/strain curve. In such a curve, the Young's Modulus (the EB) is the slope of the graph of flexural stress versus strain.

Analysis of INSTRON Data of Composite Samples m-Phenylenevinylene-2,5-disubstituted-p-phenylenevinylene aids in dispersing the SWNT ropes in such a way that it allows them to develop a cohesive interaction with the epoxy matrix relative to the SWNTs alone. In addition, when the m-phenylenevinylene-2,5-disubstituted-p-phenylenevinylene is combined with the CarboLex SWNTs, and to a lesser extent the HiPco SWNTs, the epoxy is less viscous and tends to flow better relative to epoxy and nanotubes without m-phenylenevinylene-2,5-disubstituted-p-phenylenevinylene. Also, it appears that the type of epoxy and/or hardener used has an influence on how the m-phenylenevinylene-2,5-disubstituted-p-phenylenevinylene/SWNT mixture behaves in the final composite.

Data can be collected with several different epoxies. For example XUMY 722 (CIBA, discontinued), GY6008 and GY282. 175° C. was used as the highest curing temperature for composites that have m-phenylenevinylene-2,5-disubstituted-p-phenylenevinylene. The PmPV decomposes at 200° C. making the composites weaker. With the AP grade (as-prepared) Carbolex (AP CAR) nanotubes, half of their weight is a contaminant of graphitic carbon with some Ni/Y catalyst.

Measurement of the Electrical Properties the SWNT/m-phenylenevinylene-2,5-disubstituted-p-phenylenevinylene/Epoxy Composites Because the electrical properties of carbon nanotubes are so remarkable, the measurement of resistivity of composites of this invention can be of interest. Initial investigation involves placing two electrodes on the composite material and measuring the resistance. Alternatively, two wires are arranged so that they laid across a small depression in an aluminum block or pan. This depression can be filed with the composite containing the carbon nanotubes and then cured. Resistance can be measured between the wires. To obtain quantitative information, test samples are formed using a Teflon spacer between two silver electrode plates (Test Config.) This method gives reliable quantitative data on electrical resistance measurements of composites.

Epoxies containing carbon nanotubes are more conducting than epoxies that did not contain carbon nanotubes and the higher the concentration of carbon nanotubes in the epoxy the greater the conduction (the lower the resistance). As was just said, a quantitative measure of the resistivity of our samples would be more informative and this measurement needs a known field over a known area between the two electrodes. Resistivity is measured when there is a constant current flow i, with voltage V across a known cross sectional area A separated by length I. Since $R=V/i$, $\rho=VA/iI=RA/I$.

When a first sample prepared in the Test Config, was tested no conductivity was measured in the sample. The first samples of epoxy composite were made using m-phenylenevinylene-2,5-disubstituted-p-phenylenevinylene (with $R^1$ and $R^2$=octadecyloxy) and very purified SWNT. Very purified SWNT wrapped with the m-phenylenevinylene-2,5-disubstituted-p-phenylenevinylene did not conduct as well as the unpurified SWNT. It was expected that pure SWNT would make a much better conducting composite than unpurified SWNT. However, SEM data collected on these first samples suggest that the purified SWNT separated into individual nanotubes or ropes made from just a few nanotubes. It may be that at this low loading the percolation threshold is not reached with individual SWNTs. The lack of electrical conductivity may be due to the separation of the SWNT ropes by the m-phenylenevinylene-2,5-disubstituted-p-phenylenevinylene polymer to give individual nanotubes and that as a result contact between the ropes is not as high.

Measurement of the Thermal Conductivity Properties of SWNT/m-phenylenevinylene-2,5-disubstituted-p-phenylenevinylene/Composites The thermal properties of SWNTs have been shown to be exceptionally remarkable. It is of interest to determine the thermal properties of composites containing SWNTs and SWNT/m-phenylenevinylene-2,5-disubstituted-p-phenylenevinylene. These experiments can be done using a special mold to provide the stringent size and shape requirements for materials when making thermal conductivity measurements. The standard measurements can be made by a commercial testing facility (e.g., Materials Innovations Inc., Huntington Beach, Calif.).

One of ordinary skill in the art will appreciate that methods, device elements, starting materials, reagents, reaction conditions, synthetic methods, purification methods, analytical methods, methods for making composite materials, other than those specifically exemplified can be employed in the practice of the invention without resort to undue experimentation. All art-known functional equivalents, of any such methods, device elements, and materials are intended to be included in this invention.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All references cited herein are hereby incorporated by reference to the extent that there is no inconsistency with the disclosure of this specification. Some references provided herein are incorporated by reference herein to provide details concerning additional starting materials, reagents, reaction conditions, additional methods of synthesis, additional methods for making composites, additional methods of analysis and additional uses of the invention. All references cited herein are incorporated in their entirety to provide details of the state of the art and recitations therein may be employed to distinguish what is claimed in the present application from what is in the prior art.

REFERENCES

S. Iijima, Nature 354 (1991) 56.
S. Iijima and T. Ichihashi, Nature 363 (1993) 603.
M. S. Dresselhaus, G. Dresselhaus and P. C. Eklund, Science of Fullerenes and Carbon Nanotubes, Academic Press, San Diego, (1996).
S. Curran, P. Ajayan, W. J. Blau, D. Carroll, J. N. Coleman, A. B. Dalton, A. P. Davey, A. Drury, B. McCarthy, S. Maier and A. Stevens//Adv. Mater. 10 (1998) 1091.
M. M. Gauthier, Editor, Resin Transfer Molding and Structural Reaction Injection molding, In: Engineered Materials Handbook-Desk Edition, 1995, The Materials Information Society. P. 336-341.
D. Landini and F. Rolla, J. Org. Chem. 45 (1980) 3527
G. B. Sergeev, V. V. Smirnov and T. N. Rostovschchikova, Russ. Chem. Rev. 52{3} (1983) 259.
P. J. Kropp, K. A. Daus, M. W. Tubergen, K. D. Kepler, V. P. Wilson, S. L. Craig, M. M. Baillargeon and K. D. Breton, J. Am. Chem. Soc. 115 (1993) 3071.
N. S. Zefirov, S. I. Kozhushkov, B. I. Ugrak, K. A. Lukin, O. V. Kokoreva, D. S. Yufit, Y. T. Struchkov, S. Zoellner, R. Boese and A. Meijere, J. Org. Chem. 57 (1992) 701.
E. N. Lawson, W. Kitching, C. H. Kennard and K. A. Byriel, J. Org. Chem. 58 (1993) 2501.
S. Wolff, M. E. Huecas, and W. C. Agosta, J. Org. Chem. 47 (1982) 4358.
M. A. Kinsella, V. J. Kalish, and S. M. Weinreb, J. Org. Chem. 55 (1990) 105.
S. Kobayashi, K. Kamiyama and M. Ohno, J. Org. Chem. 55 (1990) 1169.
S. Mirsadeghi, G. K. Prasad, N. Whittaker and D. R. Thakker, J. Org. Chem. 54 (1989) 3091.
H. Oediger, F. Möller and K. Eiter, Synthesis (1972) 591.
D. R. Williams, F. H. White, J. Org. Chem. 52 (1987) 5067.
M. B. Smith, J. March, March's Advanced Organic Chemistry, (John Wiley and Sons, Inc New York 2001, 5 th Ed.).
J. H. Tidwell, A. J. Peat and S. L. Buchwald, J. Org. Chem. 59 (1994) 7164.
R. O. Hutchins, M. G. Hutchins and C. A. Milewski, J. Org. Chem. 37 (1972) 4190.
R. S. Monson, Chem. Comm. (1971) 113.
A. K. Bhattacharya and G. Thyagarajan, Chem. Rev. 81 (1981) 415.
Lambert et al. (1994) Chem. Phys. Lett, 226:364.
Zhao et al. (2001) J. Amer. Chem. Soc. 123:11673-11677.
Ebbesen (ed.) "Carbon Nanotubes, Preparation and Properties" CRC Press (1996).
Saito R. et al. "Physical Properties of Carbon Nanotubes" World Scientific (1998).
Dresselhaus et al. "Carbon Nanotubes: Synthesis, Structure, Properties and Applications" (2000) Springer-Verlag.)
A. Thess, et al. (1996) Science 273: 1253.

I claim:

1. A polymer composite which comprises one or more base polymers, one or more functionalized m-phenylenevinylene-2,5-disubstituted-p-phenylenevinylene polymers, and carbon nanotubes; wherein at least a portion of the one or more functionalized m-phenylenevinylene-2,5-disubstituted-p-phenylenevinylene polymers forms an aggregate with at least a portion of the carbon nanotubes; wherein the one or more functionalized m-phenylenevinylene-2,5-disubstituted-p-phenylenevinylene polymers are m-phenylenevinylene-2,5-disubstituted-p-phenylenevinylene polymers having the formula:

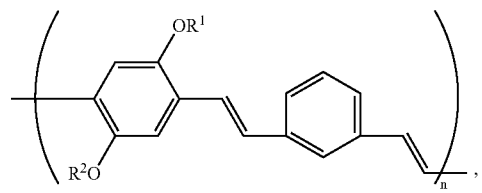

wherein n is an integer indicating the number of repeating units in the polymer; $R^1$ and $R^2$ independently are selected from the group consisting of an optionally substituted alkenyl group, an alkyl ether group, and an optionally substituted alkyl group; wherein the substituents on the alkenyl or alkyl group are one or more groups selected from the group of consisting of halogens, OH groups, —COX groups, $COOR^3$ groups, —COO⁻ groups, —$N(R^3)_2$ groups, —$N(R^3)_3^+$ groups, epoxy groups:

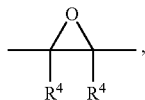

and —$Si(R^5)_3$ groups; wherein X is a halogen or an activated ester group, each $R^4$ independently is H or an alkyl group, and each $R^3$ and $R^5$ is independently selected from the group consisting of hydrogen, an alkyl group, an alkenyl group, a halogenated alkyl group, and a halogenated alkenyl group; and wherein at least one of $R^1$ and $R^2$ is a group other than an unsubstituted alkyl group.

2. The polymer composite of claim 1 wherein the carbon nanotubes are single-walled carbon nanotubes.

3. The polymer composite of claim 1 wherein the carbon nanotubes comprise single-walled carbon nanotubes, ropes of single-walled nanotubes or both.

4. The polymer composite of claim 1 wherein the base polymer is a thermoset polymer.

5. The polymer composite of claim 1 wherein the base polymer is selected from the group consisting of an epoxy, a polyester, and a nylon.

6. The polymer composite of claim 1 consisting essentially of the one or more base polymers, the one or more functionalized PmPV polymers and the carbon nanotubes.

7. The polymer composite of claim 1 wherein the one or more functionalized m-phenylenevinylene-2,5-disubstituted-p-phenylenevinylene polymers are wrapped around the carbon nanotubes.

8. The polymer composite of claim 1 wherein at least one of the $R^1$ and $R^2$ groups is an alkenyl group.

9. The polymer composite of claim 1 wherein at least one of the $R^1$ or $R^2$ groups is an ω-alkenyl group.

10. The polymer composite of claim 9 wherein the base polymer is an epoxy.

11. The polymer composite of claim 1 wherein at least one of the $R^1$ and $R^2$ groups is an alkyl epoxy group.

12. The polymer composite of claim 11 wherein the base polymer is an epoxy.

13. The polymer composite of claim 1 wherein the polymer composite comprises an amount of carbon nanotubes sufficient to exhibit a measurable enhancement in one or more mechanical properties compared to the base polymer which contains no carbon nanotubes.

14. The polymer composite of claim 1 wherein the polymer composite comprises an amount of carbon nanotubes sufficient to exhibit a measurable enhancement in mechanical strength, toughness, tensile strength, flexural strength or a combination of these properties compared to the base polymer which contains no carbon nanotubes.

15. The polymer composite of claim 1 wherein the polymer composite comprises an amount of carbon nanotubes sufficient to exhibit a measurable difference in one or more electrical properties compared to the base polymer which contains no carbon nanotubes.

16. The polymer composite of claim 1 wherein the polymer composite comprises an amount of carbon nanotubes sufficient to exhibit a measurable increase in electrical conductivity compared to the base polymer which contains no carbon nanotubes.

17. The polymer composite of claim 1 wherein the polymer composite comprises an amount of carbon nanotubes sufficient to exhibit a measurable difference in thermal conductivity compared to the base polymer which contains no carbon nanotubes.

18. The polymer composite of claim 1 wherein the $R^3$, $R^4$ and $R^5$ groups are selected from the group consisting of H, methyl, ethyl, propyl, butyl, pentyl, trifluoromethyl, and trichloromethyl groups.

19. The polymer composite of claim 1 wherein the $R^1$ and $R^2$ groups have from 8 to about 20 carbon atoms.

20. The polymer composite of claim 1 wherein the $R^1$ and $R^2$ groups are alkenes having one double bond.

21. The polymer composite of claim 20 wherein the $R^1$ and $R^2$ groups have the structures

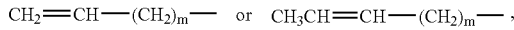

where m is an integer ranging from 1 to 17.

22. The polymer composite of claim 21 wherein m is an integer ranging from 1 to 6.

23. The polymer composite of claim 20 wherein the $R^1$ and $R^2$ groups have the structures

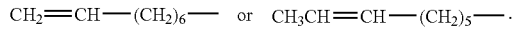

24. A method for preparation of the polymer composite of claim 1 comprising the steps of:
(a) forming one or more aggregates of carbon nanotubes and one or more functionalized m-phenylenevinylene-2,5-disubstituted-p-phenylenevinylene polymers of formula:

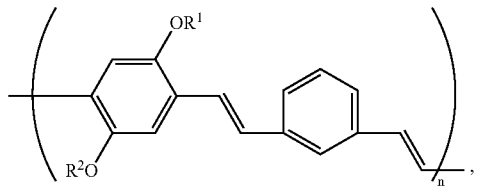

wherein n is an integer indicating the number of repeating units in the polymer; $R^1$ and $R^2$ independently are selected from the group consisting of an optionally substituted alkenyl group, an alkyl ether group, and an optionally substituted alkyl group; wherein the substituents on the alkenyl or alkyl group are one or more groups selected from the group of consisting of halogens, OH groups, —COX groups, COOR$^3$ groups, —COO$^-$ groups, —N(R$^3$)$_2$ groups, —N(R$^3$)$_3^+$ groups, epoxy groups:

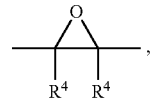

and —Si(R$^5$)$_3$ groups; wherein X is a halogen or an activated ester group, each $R^4$ independently is H or an alkyl group, and each $R^3$ and $R^5$ is independently selected from the group consisting of hydrogen, an alkyl group, an alkenyl group, a halogenated alkyl group, and a halogenated alkenyl group; and wherein at least one of $R^1$ and $R^2$ is a group other than an unsubstituted alkyl group;
(b) dispersing the aggregates in a base polymer precursor composition comprising precursors for formation of one or more base polymers; and
(c) polymerizing the base polymer.

25. The method of claim 24 further comprising a step of crosslinking one or more of the functional groups on the one or more m-phenylenevinylene-2,5-disubstituted-p-phenylenevinylene polymers with one or more functional groups of the one or more base polymers.

26. The method of claim 24 further comprising a step of reacting one or more of the functional groups on the one or more m-phenylenevinylene-2,5-disubstituted-p-phenylenevinylene polymers with one or more functional groups of the one or more base polymers.

27. The method of claim 24 further comprising a step of curing the polymer composite.

28. A polymer composite produced by forming an aggregate of one or more functionalized m-phenylenevinylene-2,5-disubstituted-p-phenylenevinylene polymers with carbon nanotubes, adding the aggregate to a base polymer precursor composition, and polymerizing the base polymer; wherein said functionalized m-phenylenevinylene-2,5-disubstituted-p-phenylenevinylene polymers are m-phenylenevinylene-2,5-disubstituted-p-phenylenevinylene polymers having the repeat unit:

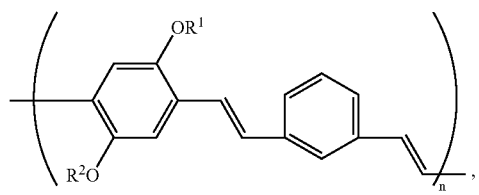

wherein n is an integer indicating the number of repeating units in the polymer; $R^1$ and $R^2$ independently are selected from the group consisting of an optionally substituted alkenyl group, an alkyl ether group, and an optionally substituted alkyl group; wherein the substituents on the alkenyl or alkyl group are one or more groups selected from the group of consisting of halogens, OH groups, —COX groups, COOR$^3$ groups, —COO$^-$ groups, —N(R$^3$)$_2$ groups, —N(R$^3$)$_3^+$ groups, epoxy groups:

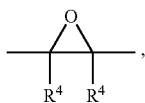

and —Si(R$^5$)$_3$ groups; wherein X is a halogen or an activated ester group, each R$^4$ independently is H or an alkyl group, and each R$^3$ and R$^5$ is independently selected from the group consisting of hydrogen, an alkyl group, an alkenyl group, a halogenated alkyl group, and a halogenated alkenyl group; and wherein at least one of R$^1$ and R$^2$ is a group other than an unsubstituted alkyl group.

29. A functionalized m-phenylenevinylene-2,5-disubstituted-p-phenylenevinylene polymer having the repeating unit:

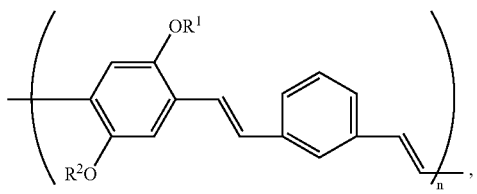

wherein n is an integer indicating the number of repeating units in the polymer; R$^1$ and R$^2$ independently are selected from the group consisting of an optionally substituted alkenyl group and an optionally substituted alkyl group; wherein the substituents on the alkenyl or alkyl group are one or more groups selected from the group of consisting of halogens, OH groups, —COX groups, COOR$^3$ groups, —COO$^-$ groups, epoxy groups:

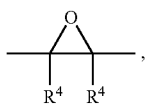

and —Si(R$^5$)$_3$ groups; wherein X is a halogen or an activated ester group, each R$^4$ independently is H or an alkyl group, and each R$^3$ and R$^5$ is independently selected from the group consisting of hydrogen, an alkyl group, an alkenyl group, a halogenated alkyl group, and a halogenated alkenyl group; and wherein at least one of R$^1$ and R$^2$ is a group other than an unsubstituted alkyl group.

30. The functionalized m-phenylenevinylene-2,5-disubstituted-p-phenylenevinylene polymer of claim 29 having the repeating unit:

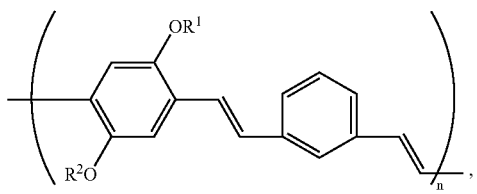

wherein n is an integer indicating the number of repeating units in the polymer; R$^1$ and R$^2$ independently are selected from the group consisting of an optionally substituted alkenyl group and an optionally substituted alkyl group; wherein the substituents on the alkenyl or alkyl group are one or more groups selected from the group of consisting of halogens, —COX groups, COOR$^3$ groups, —COO$^-$ groups, and —Si(R$^5$)$_3$ groups; wherein X is a halogen or an activated ester group, and each R$^3$ and R$^5$ is independently selected from the group consisting of hydrogen, an alkyl group, an alkenyl group, a halogenated alkyl group, and a halogenated alkenyl group; and wherein at least one of R$^1$ and R$^2$ is a group other than an unsubstituted alkyl group.

31. The functionalized m-phenylenevinylene-2,5-disubstituted-p-phenylenevinylene polymer of claim 29 wherein at least one of the R$^1$ and R$^2$ groups is an alkenyl group.

32. The functionalized m-phenylenevinylene-2,5-disubstituted-p-phenylenevinylene polymer of claim 29 wherein at least one of the R$^1$ or R$^2$ groups is an ω-alkenyl group.

33. The functionalized m-phenylenevinylene-2,5-disubstituted-p-phenylenevinylene polymer of claim 29 wherein at least one of the R$^1$ and R$^2$ groups is an alkyl epoxy group.

34. The functionalized m-phenylenevinylene-2,5-disubstituted-p-phenylenevinylene polymer of claim 29 wherein at least one of R$^1$ and R$^2$ is an alkenyl group, an ω-alkenyl group, or an alkyl epoxy group.

35. The functionalized polymer of claim 34 wherein the R$^3$, R$^4$ and R$^5$ groups are selected from the group consisting of H, methyl, ethyl, propyl, butyl, pentyl, trifluoromethyl, and trichloromethyl groups.

36. The functionalized polymer of claim 34 wherein the R$^1$ and R$^2$ groups have from 8 to about 20 carbon atoms.

37. The functionalized polymer of claim 34 wherein the R$^1$ and R$^2$ groups are alkenes having one double bond.

38. The functionalized polymer of claim 34 wherein the R$^1$ and R$^2$ groups have the structures

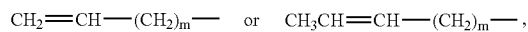

where m is an integer ranging from 1 to 17.

39. The functionalized polymer of claim 34 wherein the R$^1$ and R$^2$ groups have the structures

where m is an integer ranging from 1 to 6.

40. The functionalized polymer of claim 34 wherein the R$^1$ and R$^2$ groups have the structures

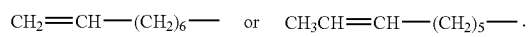

* * * * *